(12) United States Patent
Widmer

(10) Patent No.: US 9,505,314 B2
(45) Date of Patent: Nov. 29, 2016

(54) SYSTEMS, METHODS, AND APPARATUS RELATED TO DETECTING AND IDENTIFYING ELECTRIC VEHICLE AND CHARGING STATION

(71) Applicant: QUALCOMM Incorporated, San Diego, CA (US)

(72) Inventor: Hanspeter Widmer, Wohlenschwil (CH)

(73) Assignee: QUALCOMM Incorporated, San Diego, CA (US)

( * ) Notice: Subject to any disclaimer, the term of this patent is extended or adjusted under 35 U.S.C. 154(b) by 507 days.

(21) Appl. No.: 14/195,703

(22) Filed: Mar. 3, 2014

(65) Prior Publication Data

US 2015/0042168 A1 Feb. 12, 2015

Related U.S. Application Data

(60) Provisional application No. 61/864,330, filed on Aug. 9, 2013.

(51) Int. Cl.
*H02J 7/00* (2006.01)
*B60L 11/18* (2006.01)
*H04B 5/00* (2006.01)

(52) U.S. Cl.
CPC .......... *B60L 11/182* (2013.01); *B60L 11/1829* (2013.01); *B60L 11/1833* (2013.01); *H02J 50/80* (2016.02); *H02J 50/90* (2016.02); *H04B 5/0037* (2013.01); *B60L 2230/16* (2013.01); *Y02T 10/7005* (2013.01); *Y02T 10/7088* (2013.01); *Y02T 90/121* (2013.01); *Y02T 90/122* (2013.01); *Y02T 90/125* (2013.01); *Y02T 90/128* (2013.01); *Y02T 90/14* (2013.01); *Y02T 90/16* (2013.01); *Y02T 90/163* (2013.01)

(58) Field of Classification Search
USPC .................................. 307/104; 320/108, 137
See application file for complete search history.

(56) References Cited

U.S. PATENT DOCUMENTS

| 9,385,559 B2* | 7/2016 | Korekoda ........... B60L 11/1812 |
| 2012/0161530 A1* | 6/2012 | Urano ..................... H02J 7/025 |
| | | 307/104 |
| 2013/0029595 A1 | 1/2013 | Widmer et al. |
| 2013/0038272 A1 | 2/2013 | Sagata |

OTHER PUBLICATIONS

International Search Report and Written Opinion—PCT/US2014/049237—ISA/EPO—Jan. 28, 2015.

* cited by examiner

*Primary Examiner* — Danny Nguyen
(74) *Attorney, Agent, or Firm* — Knobbe, Martens, Olson & Bear, LLP

(57) ABSTRACT

Systems, methods, and apparatus are disclosed for communicating between a charging station and an electric vehicle. In one aspect, a method of pairing a charging station with an electric vehicle is provided, including providing wireless power via a magnetic field having a first intensity level that is sufficient to charge or power the electric vehicle, providing an information signal via the magnetic field when the magnetic field is set at a second intensity level that is lower than the first intensity level, the information signal uniquely identifying the charging station from a plurality of charging stations, communicating with the electric vehicle via a communication link that is different from the magnetic field, communicating comprising communicating with the electric vehicle parking guidance information to the location of the charging station, and establishing the communication link based at least in part on the information signal provided via the magnetic field.

30 Claims, 11 Drawing Sheets

SYSTEMS, METHODS, AND APPARATUS RELATED TO DETECTING AND IDENTIFYING ELECTRIC VEHICLE AND CHARGING STATION

CROSS REFERENCE TO RELATED APPLICATIONS

This application claims priority under 35 U.S.C. §119(e) to U.S. Provisional Patent Application No. 61/864,330 entitled "SYSTEMS, METHODS, AND APPARATUS RELATED TO DETECTING AND IDENTIFYING ELECTRIC VEHICLE AND CHARGING STATION" filed on Aug. 9, 2013 the disclosure of which is hereby incorporated by reference in its entirety.

FIELD

The present disclosure relates generally to wireless power transfer, and more specifically to devices, systems, and methods related to wireless power transfer to remote systems such as vehicles including batteries and communications therebetween.

BACKGROUND

Remote systems, such as vehicles, have been introduced that include locomotion power derived from electricity received from an energy storage device such as a battery. For example, hybrid electric vehicles include on-board chargers that use power from vehicle braking and traditional motors to charge the vehicles. Vehicles that are solely electric generally receive the electricity for charging the batteries from other sources. Battery electric vehicles (electric vehicles) are often proposed to be charged through some type of wired alternating current (AC) such as household or commercial AC supply sources. The wired charging connections require cables or other similar connectors that are physically connected to a power supply. Cables and similar connectors may sometimes be inconvenient or cumbersome and have other drawbacks. Wireless charging systems that are capable of transferring power in free space (e.g., via a wireless field) to be used to charge electric vehicles may overcome some of the deficiencies of wired charging solutions.

In a parking facility with a plurality of charging stations available, an electric vehicle typically navigates within the parking facility to find a proper parking space for receiving charging from a charging station therein. An electric vehicle may attempt to pair with one or more charging stations within its communication range when a driver is attempting to use a wireless power charging facility with multiple charging pads. As such, wireless charging systems and methods that efficiently and effectively facilitate the identification of a charging station for a vehicle are needed.

SUMMARY

Various implementations of systems, methods and devices within the scope of the appended claims each have several aspects, no single one of which is solely responsible for the desirable attributes described herein. Without limiting the scope of the appended claims, some prominent features are described herein.

Details of one or more implementations of the subject matter described in this specification are set forth in the accompanying drawings and the description below. Other features, aspects, and advantages will become apparent from the description, the drawings, and the claims. Note that the relative dimensions of the following figures may not be drawn to scale.

One aspect of the subject matter described in the disclosure provides an apparatus for providing wireless power. The apparatus comprises a transmitter comprising one or more coils configured to provide wireless power via a magnetic field having a first intensity level that is sufficient to charge or power an electric vehicle, the one or more coils further configured to provide an information signal via the magnetic field when the magnetic field is set at a second intensity level that is lower than the first intensity level, the information signal having one or more characteristics that uniquely identify the transmitter from a plurality of transmitters. The apparatus further comprises a transceiver configured to communicate with the electric vehicle via a communication link that is different from the magnetic field, the transceiver further configured to establish the communication link with the electric vehicle based at least in part on the information signal provided via the magnetic field, wherein the transmitter is further configured to communicate with the electric vehicle, via the communication link, parking guidance information to the location of the one or more coils.

Another aspect of the subject matter described in the disclosure provides an apparatus for receiving wireless power. The apparatus comprises a battery. The apparatus further comprises a receiver comprising one or more coils configured to receive wireless power from a charging station via a magnetic field having a first intensity level that is sufficient to charge or power the battery, the one or more coils further configured to provide an information signal via the magnetic field when the magnetic field is set at a second intensity level that is lower than the first intensity level, the information signal having one or more characteristics that uniquely identify the transmitter from a plurality of transmitters. The apparatus further comprises a transceiver configured to communicate with the charging station via a communication link that is different from the magnetic field, the transceiver configured to establish the communication link with the charging station based at least in part on the information signal provided via the magnetic field, wherein the receiver is further configured to communicate with the charging station, via the communication link, parking guidance information to the location of the one or more coils.

Another aspect of the subject matter described in the disclosure provides a method of pairing a charging station with an electric vehicle. The method comprises providing wireless power via a magnetic field having a first intensity level that is sufficient to charge or power the electric vehicle. The method further comprises providing an information signal via the magnetic field when the magnetic field is set at a second intensity level that is lower than the first intensity level, the information signal having one or more characteristics that uniquely identify the transmitter from a plurality of transmitters. The method further comprises communicating with the electric vehicle via a communication link that is different from the magnetic field, communicating via the communication link comprising communicating with the electric vehicle parking guidance information to the location of the charging station. The method further comprises establishing the communication link with the electric vehicle based at least in part on the information signal provided via the magnetic field.

Another aspect of the subject matter described in the disclosure provides an apparatus for providing wireless power. The apparatus comprises means for providing wireless power via a magnetic field having a first intensity level that is sufficient to charge or power an electric vehicle, the providing means further configured to provide an information signal via the magnetic field when the magnetic field is set at a second intensity level that is lower than the first intensity level, the information signal having one or more characteristics that uniquely identify the transmitter from a plurality of transmitters. The apparatus further comprises means for communicating with the electric vehicle via a communication link that is different from the magnetic field, the communicating means configured to communicate with the electric vehicle, via the communication link, parking guidance information to the location of the charging station. The apparatus further comprises means for establishing the communication link with the electric vehicle based at least in part on the information signal provided via the magnetic field.

Figure 1:
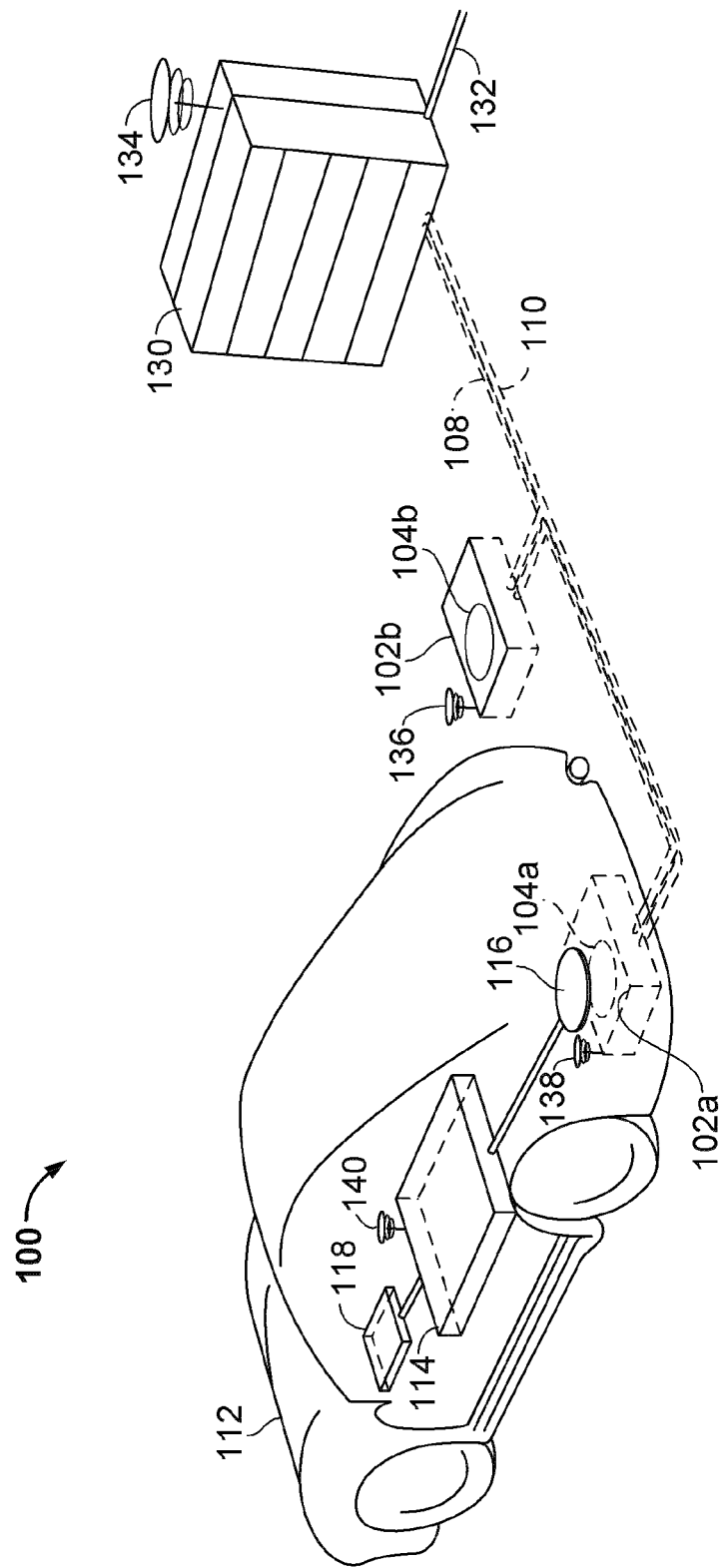
FIG. 1 illustrates a diagram of an exemplary wireless power transfer system for charging an electric vehicle, in accordance with an exemplary embodiment of the invention.

The various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DETAILED DESCRIPTION

The detailed description set forth below in connection with the appended drawings is intended as a description of exemplary embodiments of the invention and is not intended to represent the only embodiments in which the invention may be practiced. The term "exemplary" used throughout this description means "serving as an example, instance, or illustration," and should not necessarily be construed as preferred or advantageous over other exemplary embodiments. The terms "first" and "second" are used herein to distinguish among various elements (e.g., "first frequency" and "second frequency") and are not intended to denote any particular order to these elements. The detailed description includes specific details for the purpose of providing a thorough understanding of the exemplary embodiments of the invention. In some instances, some devices are shown in block diagram form.

Wirelessly transferring power may refer to transferring any form of energy associated with electric fields, magnetic fields, electromagnetic fields, or otherwise from a transmitter to a receiver without the use of physical electrical conductors (e.g., power may be transferred through free space). The power output into a wireless field (e.g., a magnetic field) may be received, captured by, or coupled by a "receiving coil" to achieve power transfer.

An electric vehicle is used herein to describe a remote system, an example of which is a vehicle that includes, as part of its locomotion capabilities, electrical power derived from a chargeable energy storage device (e.g., one or more rechargeable electrochemical cells or other type of battery). As non-limiting examples, some electric vehicles may be hybrid electric vehicles that include besides electric motors, a traditional combustion engine for direct locomotion or to charge the vehicle's battery. Other electric vehicles may draw all locomotion ability from electrical power. An electric vehicle is not limited to an automobile and may include motorcycles, carts, scooters, and the like. By way of example and not limitation, a remote system is described herein in the form of an electric vehicle (EV). Furthermore, other remote systems that may be at least partially powered using a chargeable energy storage device are also contemplated (e.g., electronic devices such as personal computing devices and the like).

FIG. 1 is a diagram of an exemplary wireless power transfer system 100 for charging an electric vehicle 112, in accordance with an exemplary embodiment of the invention. The wireless power transfer system 100 enables charging of an electric vehicle 112 while the electric vehicle 112 is parked near a base wireless charging system 102a. Spaces for two electric vehicles are illustrated in a parking area to be parked over corresponding base wireless charging system 102a and 102b. In some embodiments, a local distribution center 130 may be connected to a power backbone 132 and configured to provide an alternating current (AC) or a direct current (DC) supply through a power link 110 to the base wireless charging system 102a. The base wireless charging system 102a also includes a base system induction coil 104a for wirelessly transferring or receiving power or for providing signals via a magnetic field and an antenna 136. An electric vehicle 112 may include a battery unit 118, an electric vehicle induction coil 116, an electric vehicle wireless charging system 114, and an antenna 140. The electric vehicle induction coil 116 may interact with the base system induction coil 104a for example, via a region of the electromagnetic field generated by the base system induction coil 104a.

In some exemplary embodiments, the electric vehicle induction coil 116 may receive power when the electric vehicle induction coil 116 is located in an energy field produced by the base system induction coil 104a. The field corresponds to a region where energy output by the base system induction coil 104a may be captured by an electric vehicle induction coil 116. For example, the energy output by the base system induction coil 104a may be at a level sufficient to charge or power the electric vehicle 112 (e.g., to charge the battery unit 118). In some cases, the field may correspond to the "near field" of the base system induction coil 104a. The near-field may correspond to a region in which there are strong reactive fields resulting from the currents and charges in the base system induction coil 104a that do not radiate power away from the base system induction coil 104a. In some cases the near-field may correspond to a region that is within about ½π of wavelength of the base system induction coil 104a (and vice versa for the electric vehicle induction coil 116) as will be further described below.

In some exemplary embodiments, the base wireless charging system 102a may be configured to communicate with the electric vehicle 112 via a magnetic field. For example the base wireless charging system 102a may communicate with the electric vehicle 112 by providing an information signal via a magnetic field, the signal provided at intensity level lower that the level for wireless power transmission and having one or more characteristics to uniquely identify the base wireless charging system 102a from a plurality of base wireless charging systems. As shown in FIG. 5B (more fully described below), the information signal may be configured at a frequency other than the frequency used for wireless power transfer (WPT), the signal may further be configured as a modulation of the magnetic field. The electric vehicle 112 may sense the information signal (e.g., low level magnetic beacons) in the presence of strong emissions emanating from active base wireless charging systems 102 located in the immediate vicinity. Since it may be undesirable to have power transfer interrupted when an electric vehicle 112 is sensing magnetic beacon signals, the beacons may be emitted in a separate frequency band that is sufficiently offset from the WPT operating frequency to avoid interference (e.g. 10-20 kHz), as shown in FIG. 5B. Since the base wireless charging system 102a emits the magnetic beacon signals at low levels, the signals may be generated by WPT hardware without need for retuning resonant circuits (e.g., charging inductions coils may be driven off resonance), provided that pulse-width modulation (PWM) waveform can be synthesized in fine enough frequency steps.

To separate different beacon signal emissions and to avoid mutual interference, the base wireless charging system 102a may modulate the magnetic field. The modulation may be any type of modulation or combination of modulation, such as, for example, a single pulse, digital sequence, frequency division, time division, code division, etc. For example, for a frequency division scheme, the signal frequencies may be assigned fixed or dynamically on a temporary basis in a separate frequency that is offset from the wireless power transmission operating frequency by at least 10 kHz to avoid interference between the signal and the wireless power transfer and interference between multiple signals. The electric vehicle 112 may receive the signal via one or more sensors (not shown) configured to detect and receive a signal via a magnetic field. The electric vehicle 112 may also use the signal to determine the distance and/or direction of the base wireless charging system 102a.

In-band signaling using a magnetic field may provide numerous benefits. For example, while radio frequency (RF) signal strength decays proportionally (far field), the low frequency magnetic field generated by a base wireless charging system 102 decays approximately to the cube of the unwanted distance (near field) making it more suitable for discriminating between unwanted (neighboring) charging stations and the wanted charging station. Additionally, the magnetic field may be less affected by objects (e.g., vehicles, walls, curbs, etc.) in the surrounding area compared to RF. Additionally, the low frequency magnetic field may enable an electric vehicle 112 to determine a correct charging station in a plurality of charging stations based on a distance and optionally based on an angle by sensing the direction of the magnetic field lines. Further, in some aspects, multiple charging stations may emit a low frequency (LF) magnetic beacon signal to allow an electric vehicle to determine the right charging station from which to receive power. Many of the charging station coils (e.g. base system induction coil 104a) may not be covered by a vehicle and persons may be located on charging spots that may require low flux levels to meet exposure limits (e.g. 6.25 uT) at any point on a parking lot. Electromagnetic Compatibility (EMC) standards may not permit in-band data signaling on such a high power carrier. Future regulations may require that high power signals only be transmitted in a limited band assigned to inductive power transfer (IPT) applications. To avoid interference from charging systems on neighboring parking bays, a base wireless charging system 102a may use a separate frequency band for magnetic field sensing and lower emission levels may apply in this LF band. A low level magnetic beacon signal may have the advantage of increasing system efficiency. Moreover, no additional hardware may be needed for generating the magnetic signal, especially if the magnetic field is also used for purposes of positioning, vehicle guidance and alignment. Use of the magnetic signal may require sensitive and frequency selective magnetic field sensors. Such sensors may be integrated into the existing equipment of an electric vehicle 112 or a base wireless charging system 102 and space requirements may be negligible.

In some embodiments, an electric vehicle 112 may utilize the magnetic signal for pairing purposes, i.e. to pair with a corresponding base wireless charging system 102. In some embodiments, such pairing can be accomplished by detecting and identifying the magnetic field of the base wireless charging system 102 the electric vehicle 112 is going to be supplied from and by correlating signals transmitted out-of-band (i.e. UHF) with signals transmitted on the LF magnetic field. This procedure, however, may require the magnetic field being modulated in one form or another as describe above (e.g., single pulse, digital sequence, frequency division, etc.)

In some exemplary embodiments, the magnetic field signal transmit and receive capabilities may be configured to be reciprocal such that the electric vehicle 112 provides a signal via a magnetic field to the base wireless charging system 102a and the base wireless charging system 102a receives the signal to uniquely identify the electric vehicle 112 from a plurality of electric vehicles.

In accordance, certain aspects of embodiments described herein allow for establishing, in a scenario where multiple base charging systems 102a are positioned in close proximity to each other, a communication link between an electric vehicle wireless charging system 114 and a selected base wireless charging system 102a before the electric vehicle 112 is positioned over the inductions coil 104a of the base wireless charging system 102a. As a result of pairing with the correct base wireless charging system 102a before alignment or guidance, the communication link may be used to communicate guidance and alignment information to allow an operator of the electric vehicle 112 to move into the correct position for charging.

Local distribution center 130 may be configured to communicate with external sources (e.g., a power grid) via a communication backhaul 134, and with the base wireless charging system 102a via a communication link 108.

With reference to FIG. 1, base wireless charging systems 102a and 102b may be configured to communicate with the electric vehicle wireless charging system 114 via antennas 136 and 138 or via electric vehicle induction coils 104a and 104b. For example, the wireless charging system 102a may communicate with the electric vehicle wireless charging system 114 using a communication channel between antennas 138 and 140. The communication channels may be any type of communication channels such as, for example, Bluetooth, zigbee, cellular, wireless local area network (WLAN), etc.

In some embodiments the electric vehicle induction coil 116 may be aligned with the base system induction coil 104a and, therefore, disposed within a near-field region simply by the driver positioning the electric vehicle 112 correctly relative to the base system induction coil 104a. In other embodiments, the driver may be given visual feedback, auditory feedback, or combinations thereof to determine when the electric vehicle 112 is properly placed for wireless power transfer. In yet other embodiments, the electric vehicle 112 may be positioned by an autopilot system, which may move the electric vehicle 112 back and forth (e.g., in zig-zag movements) until an alignment error has reached a tolerable value. This may be performed automatically and autonomously by the electric vehicle 112 without or with only minimal driver intervention provided that the electric vehicle 112 is equipped with a servo steering wheel, ultrasonic sensors, and intelligence to adjust the vehicle. In still other embodiments, the electric vehicle induction coil 116, the base system induction coil 104a, or a combination thereof may have functionality for displacing and moving the induction coils 116 and 104a relative to each other to more accurately orient them and develop more efficient coupling therebetween.

The base wireless charging system 102a may be located in a variety of locations. As non-limiting examples, some suitable locations include a parking area at a home of the electric vehicle 112 owner, parking areas reserved for electric vehicle wireless charging modeled after conventional petroleum-based filling stations, and parking lots at other locations such as shopping centers and places of employment.

Charging electric vehicles wirelessly may provide numerous benefits. For example, charging may be performed automatically, virtually without driver intervention and manipulations thereby improving convenience to a user. There may also be no exposed electrical contacts and no mechanical wear out, thereby improving reliability of the wireless power transfer system 100. Manipulations with cables and connectors may not be needed, and there may be no cables, plugs, or sockets that may be exposed to moisture and water in an outdoor environment, thereby improving safety. There may also be no sockets, cables, and plugs visible or accessible, thereby reducing potential vandalism of power charging devices. Further, since an electric vehicle 112 may be used as distributed storage devices to stabilize a power grid, a docking-to-grid solution may be used to increase availability of vehicles for Vehicle-to-Grid (V2G) operation.

A wireless power transfer system 100 as described with reference to FIG. 1 may also provide aesthetical and non-impedimental advantages. For example, there may be no charge columns and cables that may be impedimental for vehicles and/or pedestrians.

As a further explanation of the vehicle-to-grid capability, the wireless power transmit and receive capabilities may be configured to be reciprocal such that the base wireless charging system 102a transfers power to the electric vehicle 112 and the electric vehicle 112 transfers power to the base wireless charging system 102a e.g., in times of energy shortfall. This capability may be useful to stabilize the power distribution grid by allowing electric vehicles to contribute power to the overall distribution system in times of energy shortfall caused by over demand or shortfall in renewable energy production (e.g., wind or solar).

Figure 2:
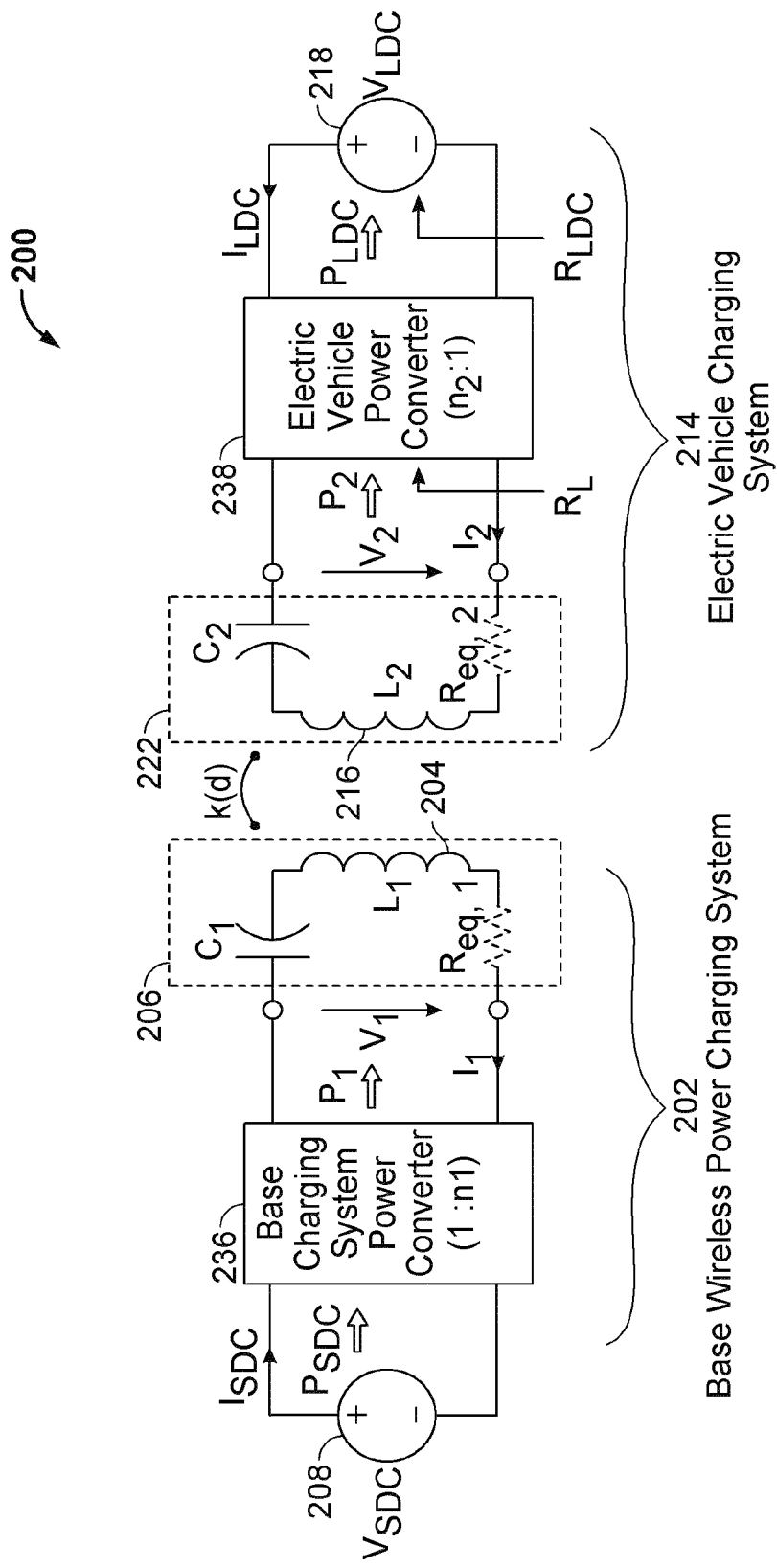
FIG. 2 illustrates a schematic diagram of exemplary core components of the wireless power transfer system of FIG. 1.

FIG. 2 is a schematic diagram of exemplary components of the wireless power transfer system 100 of FIG. 1. As shown in FIG. 2, the wireless power transfer system 200 may include a base system transmit circuit 206 including a base system induction coil 204 having an inductance $L_1$. The wireless power transfer system 200 further includes an electric vehicle receive circuit 222 including an electric vehicle induction coil 216 having an inductance $L_2$. Embodiments described herein may use capacitively loaded wire loops (i.e., multi-turn coils) forming a resonant structure that is capable of efficiently coupling energy from a primary structure (transmitter) to a secondary structure (receiver) via a magnetic or electromagnetic near field if both primary and secondary are tuned to a common resonant frequency. The coils may be used for the electric vehicle induction coil 216 and the base system induction coil 204. Using resonant structures for coupling energy may be referred to "magnetic coupled resonance," "electromagnetic coupled resonance," and/or "resonant induction." The operation of the wireless power transfer system 200 will be described based on power transfer from a base wireless power charging system 202 to an electric vehicle 112, but is not limited thereto. For example, as discussed above, the electric vehicle 112 may transfer power to the base wireless charging system 102a.

With reference to FIG. 2, a power supply 208 (e.g., AC or DC) supplies power $P_{SDC}$ to the base wireless power charging system 202 to transfer energy to an electric vehicle 112. The base wireless power charging system 202 includes a base charging system power converter 236. The base charging system power converter 236 may include circuitry such as an AC/DC converter configured to convert power from standard mains AC to DC power at a suitable voltage level, and a DC/low frequency (LF) converter configured to convert DC power to power at an operating frequency suitable for wireless high power transfer. The base charging system power converter 236 supplies power $P_1$ to the base system transmit circuit 206 including the capacitor $C_1$ in series with the base system induction coil 204 to emit an electromagnetic field at a desired frequency. The capacitor $C_1$ may be provided to form a resonant circuit with the base system induction coil 204 that resonates at a desired frequency. The base system induction coil 204 receives the power $P_1$ and wirelessly transmits power at a level sufficient to charge or power the electric vehicle 112. For example, the power level provided wirelessly by the base system induction coil 204 may be on the order of kilowatts (kW) (e.g., anywhere from 1 kW to 110 kW or higher or lower).

The base system transmit circuit 206 including the base system induction coil 204 and electric vehicle receive circuit 222 including the electric vehicle induction coil 216 may be tuned to substantially the same frequencies and may be positioned within the near-field of an electromagnetic field transmitted by one of the base system induction coil 204 and the electric vehicle induction coil 116. In this case, the base system induction coil 204 and electric vehicle induction coil 116 may become coupled to one another such that power may be transferred to the electric vehicle receive circuit 222 including capacitor $C_2$ and electric vehicle induction coil 116. The capacitor $C_2$ may be provided to form a resonant circuit with the electric vehicle induction coil 216 that resonates at a desired frequency. Element k(d) represents the mutual coupling coefficient resulting at coil separation. Equivalent resistances $R_{eq,1}$ and $R_{eq,2}$ represent the losses that may be inherent to the induction coils 204 and 216 and the anti-reactance capacitors $C_1$ and $C_2$. The electric vehicle receive circuit 222 including the electric vehicle induction coil 316 and capacitor $C_2$ receives power $P_2$ and provides the power $P_2$ to an electric vehicle power converter 238 of an electric vehicle charging system 214.

The electric vehicle power converter 238 may include, among other things, a LF/DC converter configured to convert power at an operating frequency back to DC power at a voltage level matched to the voltage level of an electric vehicle battery unit 218. The electric vehicle power converter 238 may provide the converted power $P_{LDC}$ to charge the electric vehicle battery unit 218. The power supply 208, base charging system power converter 236, and base system induction coil 204 may be stationary and located at a variety of locations as discussed above. The battery unit 218, electric vehicle power converter 238, and electric vehicle induction coil 216 may be included in an electric vehicle charging system 214 that is part of electric vehicle 112 or part of the battery pack (not shown). The electric vehicle charging system 214 may also be configured to provide power wirelessly through the electric vehicle induction coil 216 to the base wireless power charging system 202 to feed power back to the grid. Each of the electric vehicle induction coil 216 and the base system induction coil 204 may act as transmit or receive induction coils based on the mode of operation.

While not shown, the wireless power transfer system 200 may include a load disconnect unit (LDU) to safely disconnect the electric vehicle battery unit 218 or the power supply 208 from the wireless power transfer system 200. For example, in case of an emergency or system failure, the LDU may be triggered to disconnect the load from the wireless power transfer system 200. The LDU may be provided in addition to a battery management system for managing charging to a battery, or it may be part of the battery management system.

Further, the electric vehicle charging system 214 may include switching circuitry (not shown) for selectively connecting and disconnecting the electric vehicle induction coil 216 to the electric vehicle power converter 238. Disconnecting the electric vehicle induction coil 216 may suspend charging and also may adjust the "load" as "seen" by the base wireless charging system 102a (acting as a transmitter), which may be used to "cloak" the electric vehicle charging system 114 (acting as the receiver) from the base wireless charging system 102a. The load changes may be detected if the transmitter includes the load sensing circuit. Accordingly, the transmitter, such as a base wireless charging system 202, may have a mechanism for determining when receivers, such as an electric vehicle charging system 114, are present in the near-field of the base system induction coil 204.

As described above, in operation, assuming energy transfer towards the vehicle or battery, input power is provided from the power supply 208 such that the base system induction coil 204 generates a field for providing the energy transfer. The electric vehicle induction coil 216 couples to the radiated field and generates output power for storage or consumption by the electric vehicle 112. As described above, in some embodiments, the base system induction coil 204 and electric vehicle induction coil 116 are configured according to a mutual resonant relationship such that the resonant frequency of the electric vehicle induction coil 116 and the resonant frequency of the base system induction coil 204 are very close or substantially the same. Transmission losses between the base wireless power charging system 202 and electric vehicle charging system 214 are minimal when the electric vehicle induction coil 216 is located in the near-field of the base system induction coil 204.

As stated, an efficient energy transfer occurs by coupling a large portion of the energy in the near field of a transmitting induction coil to a receiving induction coil rather than propagating most of the energy in an electromagnetic wave to the far-field. When in the near field, a coupling mode may be established between the transmit induction coil and the receive induction coil. The area around the induction coils where this near field coupling may occur is referred to herein as a near field coupling mode region.

While not shown, the base charging system power converter 236 and the electric vehicle power converter 238 may both include an oscillator, a driver circuit such as a power amplifier, a filter, and a matching circuit for efficient coupling with the wireless power induction coil. The oscillator may be configured to generate a desired frequency, which may be adjusted in response to an adjustment signal. The oscillator signal may be amplified by a power amplifier with an amplification amount responsive to control signals. The filter and matching circuit may be included to filter out harmonics or other unwanted frequencies and match the impedance of the power conversion module to the wireless power induction coil. The power converters 236 and 238 may also include a rectifier and switching circuitry to generate a suitable power output to charge the battery.

The electric vehicle induction coil 216 and base system induction coil 204 as described throughout the disclosed embodiments may be referred to or configured as "loop" antennas, and more specifically, multi-turn loop antennas. The induction coils 204 and 216 may also be referred to herein or be configured as "magnetic" antennas. The term "coils" is intended to refer to a component that may wirelessly output or receive energy four coupling to another "coil." The coil may also be referred to as an "antenna" of a type that is configured to wirelessly output or receive power. As used herein, coils 204 and 216 are examples of "power transfer components" of a type that are configured to wirelessly output, wirelessly receive, and/or wirelessly relay power. As discussed above, coils 204 and 216 may be further configured to provide magnetic field signals at a different frequency and lower intensity level than for wireless power transmission to communicate with the electric vehicle 112 or base system 102a, respectively. Loop (e.g., multi-turn loop) antennas may be configured to include an air core or a physical core such as a ferrite core. An air core loop antenna may allow the placement of other components within the core area. Physical core antennas including ferromagnetic or ferromagnetic materials may allow development of a stronger electromagnetic field and improved coupling.

As discussed above, efficient transfer of energy between a transmitter and receiver occurs during matched or nearly matched resonance between a transmitter and a receiver. However, even when resonance between a transmitter and receiver are not matched, energy may be transferred at a lower efficiency. Transfer of energy occurs by coupling energy from the near field of the transmitting induction coil to the receiving induction coil residing within a region (e.g., within a predetermined frequency range of the resonant frequency, or within a predetermined distance of the near-field region) where this near field is established rather than propagating the energy from the transmitting induction coil into free space.

A resonant frequency may be based on the inductance and capacitance of a transmit circuit including an induction coil (e.g., the base system induction coil 204) as described above. As shown in FIG. 2, inductance may generally be the inductance of the induction coil, whereas, capacitance may be added to the induction coil to create a resonant structure at a desired resonant frequency. As a non-limiting example, as shown in FIG. 2, a capacitor may be added in series with the induction coil to create a resonant circuit (e.g., the base system transmit circuit 206) that generates an electromagnetic field. Accordingly, for larger diameter induction coils, the value of capacitance needed to induce resonance may decrease as the diameter or inductance of the coil increases. Inductance may also depend on a number of turns of an induction coil. Furthermore, as the diameter of the induction coil increases, the efficient energy transfer area of the near field may increase. Other resonant circuits are possible. As another non limiting example, a capacitor may be placed in parallel between the two terminals of the induction coil (e.g., a parallel resonant circuit). Furthermore an induction coil may be designed to have a high quality (Q) factor to improve the resonance of the induction coil. For example, the Q factor may be 300 or greater.

As described above, according to some embodiments, coupling power between two induction coils that are in the near field of one another is disclosed. As described above, the near field may correspond to a region around the induction coil in which electromagnetic fields exist but may not propagate or radiate away from the induction coil. Near-field coupling-mode regions may correspond to a volume that is near the physical volume of the induction coil, typically within a small fraction of the wavelength. According to some embodiments, electromagnetic induction coils, such as single and multi-turn loop antennas, are used for both transmitting and receiving since magnetic near field amplitudes in practical embodiments tend to be higher for magnetic type coils in comparison to the electric near fields of an electric type antenna (e.g., a small dipole). This allows for potentially higher coupling between the pair. Furthermore, "electric" antennas (e.g., dipoles and monopoles) or a combination of magnetic and electric antennas may be used.

Figure 3:
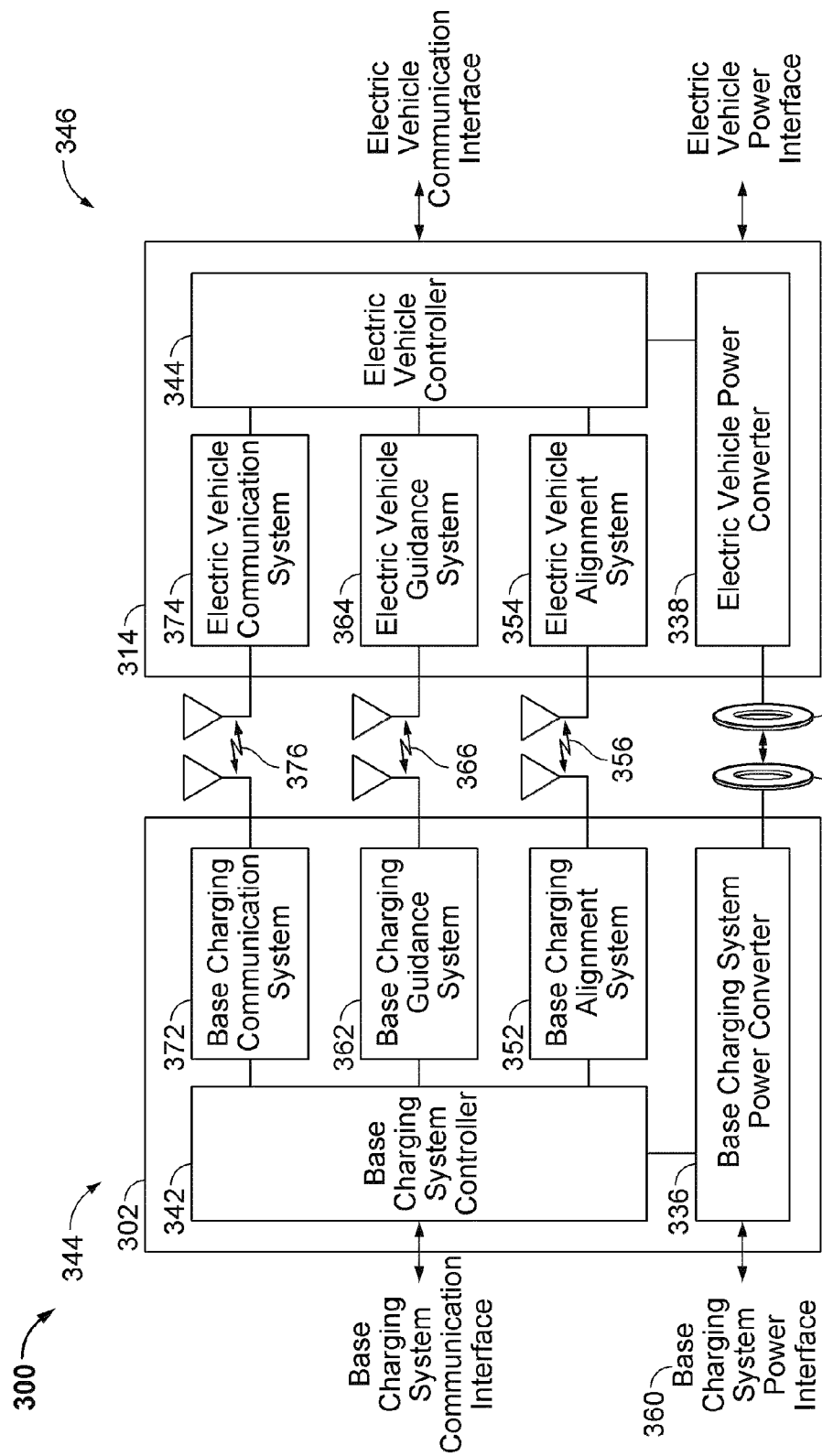
FIG. 3 illustrates another functional block diagram showing exemplary core and ancillary components of the wireless power transfer system of FIG. 1.

FIG. 3 is another functional block diagram showing exemplary core and ancillary components of the wireless power transfer system 100 of FIG. 1. The wireless power transfer system 300 illustrates a communication link 376, a guidance link 366, and alignment systems 352, 354 for the base system induction coil 304 and electric vehicle induction coil 316. As described above with reference to FIG. 2, and assuming energy flow towards the electric vehicle 112, in FIG. 3 a base charging system power interface 360 may be configured to provide power to a charging system power converter 336 from a power source, such as an AC or DC power supply 126. The base charging system power converter 336 may receive AC or DC power from the base charging system power interface 360 to excite the base system induction coil 304 at or near its resonant frequency. The electric vehicle induction coil 316, when in the near field coupling-mode region, may receive energy from the near field coupling mode region to oscillate at or near the resonant frequency. The electric vehicle power converter 338 converts the oscillating signal from the electric vehicle induction coil 316 to a power signal suitable for charging a battery via the electric vehicle power interface.

The base wireless charging system 302 includes a base charging system controller 342 and the electric vehicle charging system 314 includes an electric vehicle controller 344. The base charging system controller 342 may include a base charging system communication interface to other systems (not shown) such as, for example, a computer, a wireless device, and a power distribution center, or a smart power grid. The electric vehicle controller 344 may include an electric vehicle communication interface to other systems (not shown) such as, for example, an on-board computer on the vehicle, other battery charging controller, other electronic systems within the vehicles, and remote electronic systems.

The base charging system controller 342 and electric vehicle controller 344 may include subsystems or modules for specific application with separate communication channels. These communications channels may be separate physical channels or separate logical channels. As non-limiting examples, a base charging alignment system 352 may communicate with an electric vehicle alignment system 354 through a communication link 356 to provide a feedback mechanism for more closely aligning the base system induction coil 304 and electric vehicle induction coil 316, either autonomously or with operator assistance. Similarly, a base charging guidance system 362 may communicate with an electric vehicle guidance system 364 through a guidance link 366 to provide a feedback mechanism to guide an operator in aligning the base system induction coil 304 and electric vehicle induction coil 316. In addition, there may be separate general-purpose communication links (e.g., channels), such as communication link 376, supported by base charging communication system 372 and electric vehicle communication system 374 for communicating other information between the base wireless power charging system 302 and the electric vehicle charging system 314. This information may include information about electric vehicle characteristics, battery characteristics, charging status, and power capabilities of both the base wireless power charging system 302 and the electric vehicle charging system 314, as well as maintenance and diagnostic data for the electric vehicle 112. These communication links or channels may be separate physical communication channels such as, for example, Dedicated Short-Range Communications (DSRC), IEEE 702.11x (e.g., WiFi), Bluetooth, zigbee, cellular, etc. In another embodiment, the communication links may be based at least in part on a signal provided via magnetic field by the base system induction coil 304 or the electric vehicle induction coil 316. The applicable communication system may establish a communication link by correlating the information received via the separate physical communication channels with the signals transmitted via the magnetic field.

Electric vehicle controller 344 may also include a battery management system (BMS) (not shown) that manages charge and discharge of the electric vehicle principal battery, a parking assistance system based on microwave or ultrasonic radar principles, a brake system configured to perform a semi-automatic parking operation, and a steering wheel servo system configured to assist with a largely automated parking 'park by wire' that may provide higher parking accuracy, thus reducing the need for mechanical horizontal induction coil alignment in any of the base wireless charging system 102a and the electric vehicle charging system 114. Further, electric vehicle controller 344 may be configured to communicate with electronics of the electric vehicle 112. For example, electric vehicle controller 344 may be configured to communicate with visual output devices (e.g., a dashboard display), acoustic/audio output devices (e.g., buzzer, speakers), mechanical input devices (e.g., keyboard, touch screen, and pointing devices such as joystick, trackball, etc.), and audio input devices (e.g., microphone with electronic voice recognition).

Furthermore, the wireless power transfer system 300 may include detection and sensor systems. For example, the wireless power transfer system 300 may include sensors for use with systems to properly guide the driver or the vehicle to the charging spot, sensors to detect magnetic field signals provided by the induction coils, sensors to detect the angle and direction of a vehicle, sensors to mutually align the induction coils with the required separation/coupling, sensors to detect objects that may obstruct the electric vehicle induction coil 316 from moving to a particular height and/or position to achieve coupling, and safety sensors for use with systems to perform a reliable, damage free, and safe operation of the system. For example, a safety sensor may include a sensor for detection of presence of animals or children approaching the wireless power induction coils 104a, 116 beyond a safety radius, detection of metal objects near the base system induction coil 304 that may be heated up (induction heating), detection of hazardous events such as incandescent objects on the base system induction coil 304, and temperature monitoring of the base wireless power charging system 302 and electric vehicle charging system 314 components.

The wireless power transfer system 300 may also support plug-in charging via a wired connection. A wired charge port may integrate the outputs of the two different chargers prior to transferring power to or from the electric vehicle 112. Switching circuits may provide the functionality as needed to support both wireless charging and charging via a wired charge port.

To communicate between a base wireless charging system 302 and an electric vehicle charging system 314, the wireless power transfer system 300 may use both in-band signaling and an RF data modem (e.g., Ethernet over radio in an unlicensed band). The out-of-band communication may provide sufficient bandwidth for the allocation of value-added services to the vehicle user/owner. A low depth amplitude or phase modulation of the wireless power carrier may serve as an in-band signaling system with minimal interference.

In addition, some communication may be performed via the wireless power link without using specific communications antennas. For example, the wireless power induction coils 304 and 316 may also be configured to act as wireless communication transmitters. Thus, some embodiments of the base wireless power charging system 302 may include a controller (not shown) for enabling keying type protocol on the wireless power path. By keying the transmit power level (amplitude shift keying) at predefined intervals with a predefined protocol, the receiver may detect a serial communication from the transmitter. The base charging system power converter 336 may include a load sensing circuit (not shown) for detecting the presence or absence of active electric vehicle receivers in the vicinity of the near field generated by the base system induction coil 304. By way of example, a load sensing circuit monitors the current flowing to the power amplifier, which is affected by the presence or absence of active receivers in the vicinity of the near field generated by base system induction coil 104a. Detection of changes to the loading on the power amplifier may be monitored by the base charging system controller 342 for use in determining whether to enable the oscillator for transmitting energy, to communicate with an active receiver, or a combination thereof.

To enable wireless high power transfer, some embodiments may be configured to transfer power at a frequency in the range from 10-150 kHz. This low frequency coupling may allow highly efficient power conversion that may be achieved using solid state devices. In addition, there may be less coexistence issues with radio systems compared to other bands.

In some embodiments, the power induction coils 304 and 316 may be configured to act as wireless communication transmitters providing signals via a magnetic field. The signals may be configured at a frequency other than the frequency for wireless power transfer.

The wireless power transfer system 100 described may be used with a variety of electric vehicles 102 including rechargeable or replaceable batteries.

Figure 4:
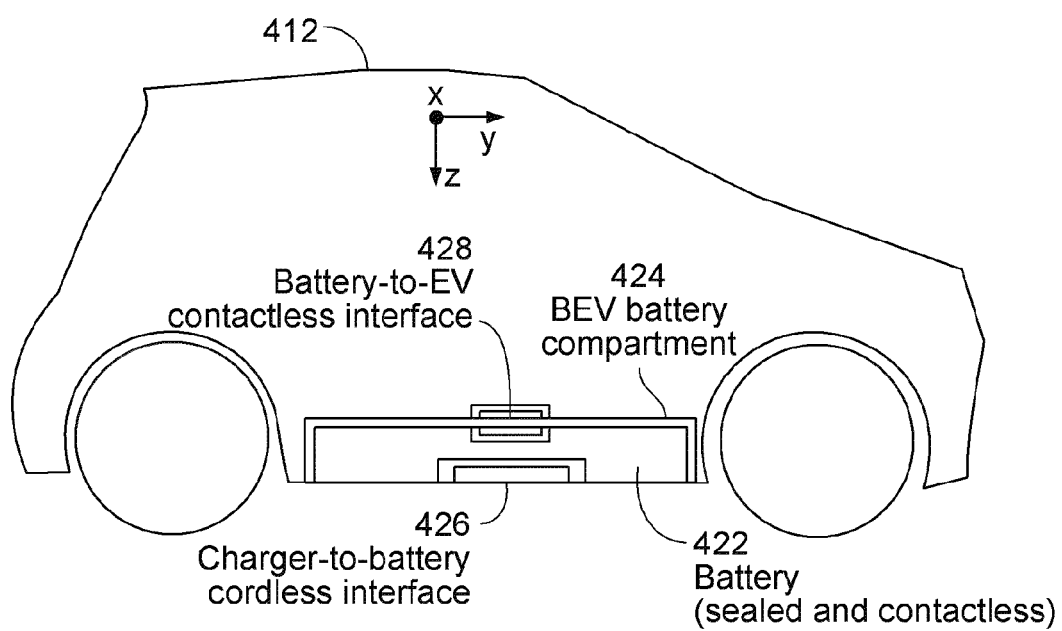
FIG. 4 is a functional block diagram showing a replaceable contactless battery disposed in an electric vehicle, in accordance with an exemplary embodiment of the invention.

FIG. 4 is a functional block diagram showing a replaceable contactless battery disposed in an electric vehicle 412, in accordance with an exemplary embodiment of the invention. In this embodiment, the low battery position may be useful for an electric vehicle battery unit that integrates a wireless power interface (e.g., a charger-to-battery cordless interface 426) and that may receive power from a charger (not shown) embedded in the ground. In FIG. 4, the electric vehicle battery unit may be a rechargeable battery unit, and may be accommodated in a battery compartment 424. The electric vehicle battery unit also provides a wireless power interface 426, which may integrate the entire electric vehicle wireless power subsystem including a resonant induction coil, power conversion circuitry, and other control and communications functions as needed for efficient and safe wireless energy transfer between a ground-based wireless charging unit and the electric vehicle battery unit.

It may be useful for the electric vehicle induction coil to be integrated flush with a bottom side of electric vehicle battery unit or the vehicle body so that there are no protrusive parts and so that the specified ground-to-vehicle body clearance may be maintained. This configuration may require some room in the electric vehicle battery unit dedicated to the electric vehicle wireless power subsystem. The electric vehicle battery unit 422 may also include a battery-to-EV cordless interface 422, and a charger-to-battery cordless interface 426 that provides contactless power and communication between the electric vehicle 412 and a base wireless charging system 102a as shown in FIG. 1.

As discussed above, the electric vehicle charging system 114 may be placed on the underside of the electric vehicle 112 for transmitting and receiving power from a base wireless charging system 102a. For example, an electric vehicle induction coil 116 may be integrated into the vehicles underbody preferably near a center position providing maximum safety distance in regards to EM exposure and permitting forward and reverse parking of the electric vehicle.

Figure 5A:
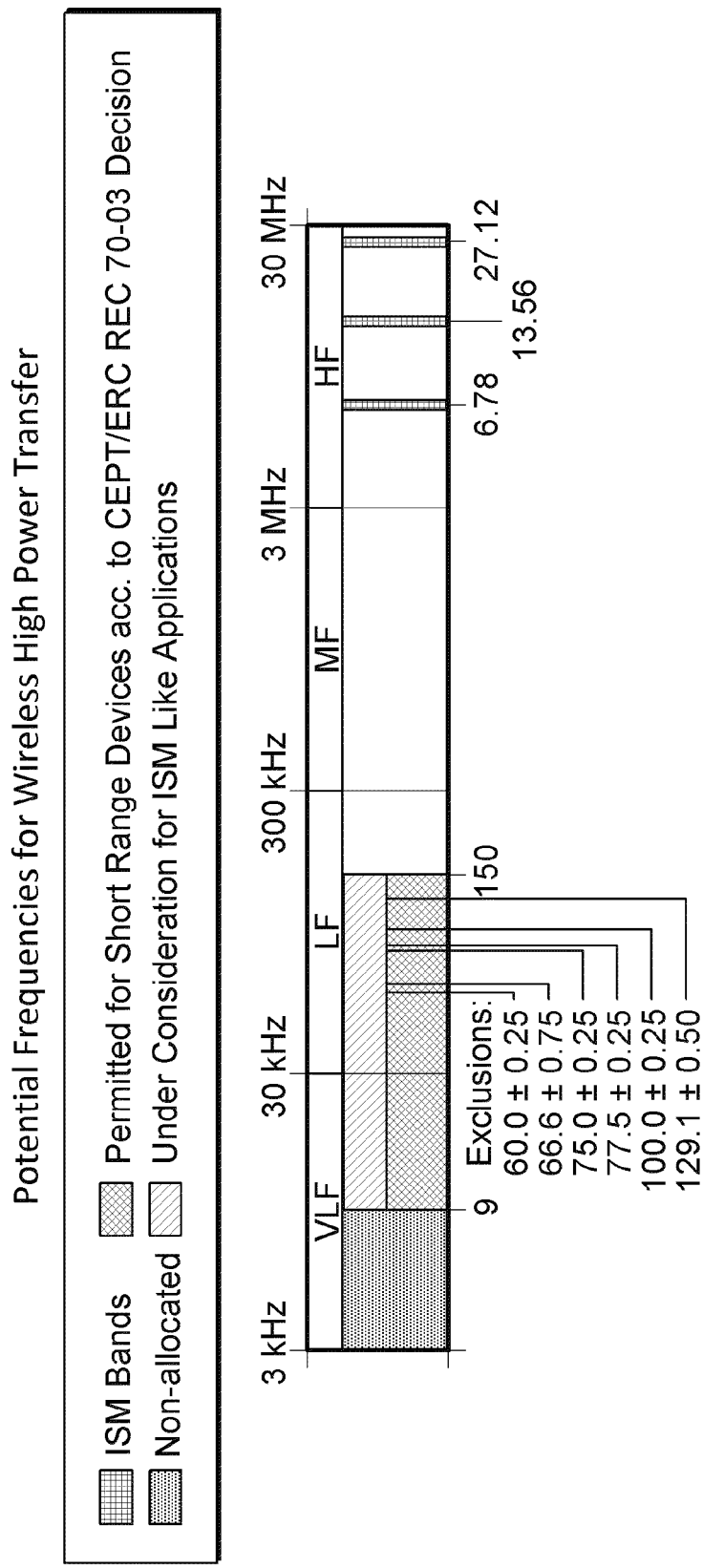
FIG. 5A is a chart of a frequency spectrum showing exemplary frequencies that may be used for wireless charging an electric vehicle, in accordance with an exemplary embodiment of the invention.
Figure 5B:
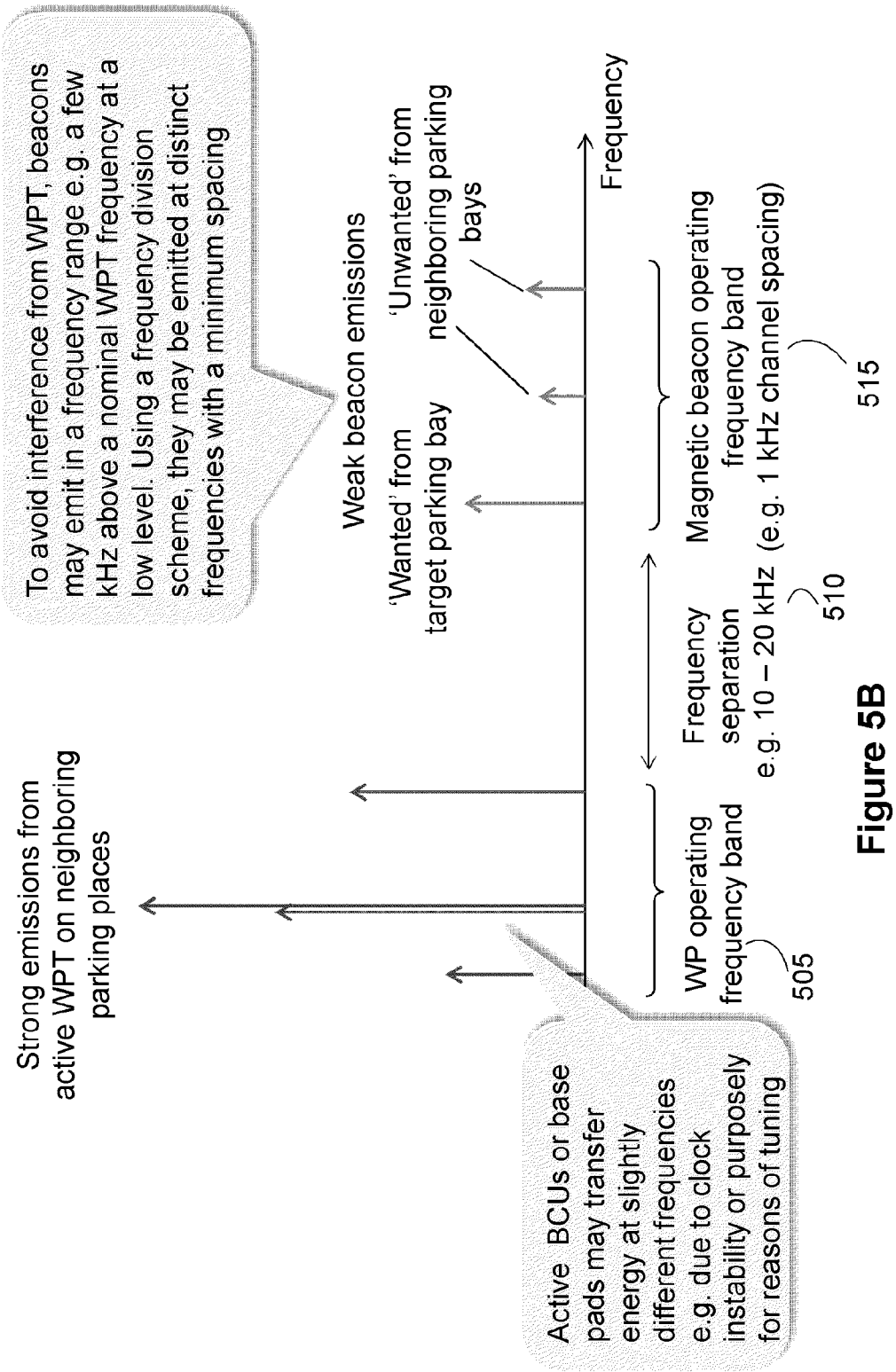
FIG. 5B is a chart of a frequency spectrum showing exemplary frequencies that may be used for wireless charging an electric vehicle and for providing magnetic information/beacon signals, in accordance with an exemplary embodiment of the invention.

FIG. 5A is a chart of a frequency spectrum showing exemplary frequencies that may be used for wireless charging an electric vehicle, in accordance with an exemplary embodiment of the invention. As shown in FIG. 5A, potential frequency ranges for wireless high power transfer to electric vehicles may include: VLF in a 3 kHz to 30 kHz band, lower LF in a 30 kHz to 150 kHz band (for ISM-like applications) with some exclusions, HF 6.78 MHz (ITU-R ISM-Band 6.765-6.795 MHz), HF 13.56 MHz (ITU-R ISM-Band 13.553-13.567), and HF 27.12 MHz (ITU-R ISM-Band 26.957-27.283).

FIG. 5B is a diagram of a frequency spectrum showing exemplary frequencies that may be used for wireless power transfer (WPT) and exemplary frequencies for the low power magnetic information, or beacon, signals that may be used for wireless charging an electric vehicle or pairing an electric vehicle with a charging station, in accordance with an exemplary embodiment of the invention. As shown in FIG. 5B, WPT may occur within a wireless power (WP) operating frequency band 505 at the lower end of the frequency spectrum. As shown, active BCUs or base pads may transfer WP at slightly different frequencies within the WP operating frequency band 505 e.g., due to clock instability or purposely for reasons of tuning. In some embodiments the WP operating frequency band 505 may comprise the potential frequency ranges depicted in FIG. 5A. In some embodiments, the WP operating frequency band 505 may be offset from a magnetic beacon operating frequency band 515 by a frequency separation 510. In some aspects, the frequency separation may comprise an offset of 10-20 kHz. In some aspects, using a frequency division scheme, BCUs or base pads may emit magnetic beacons at distinct frequencies with certain channel spacing. In some aspects, the frequency channel spacing within the magnetic beacon operating frequency band 515 may comprise 1 kHz channel spacing.

Figure 6:
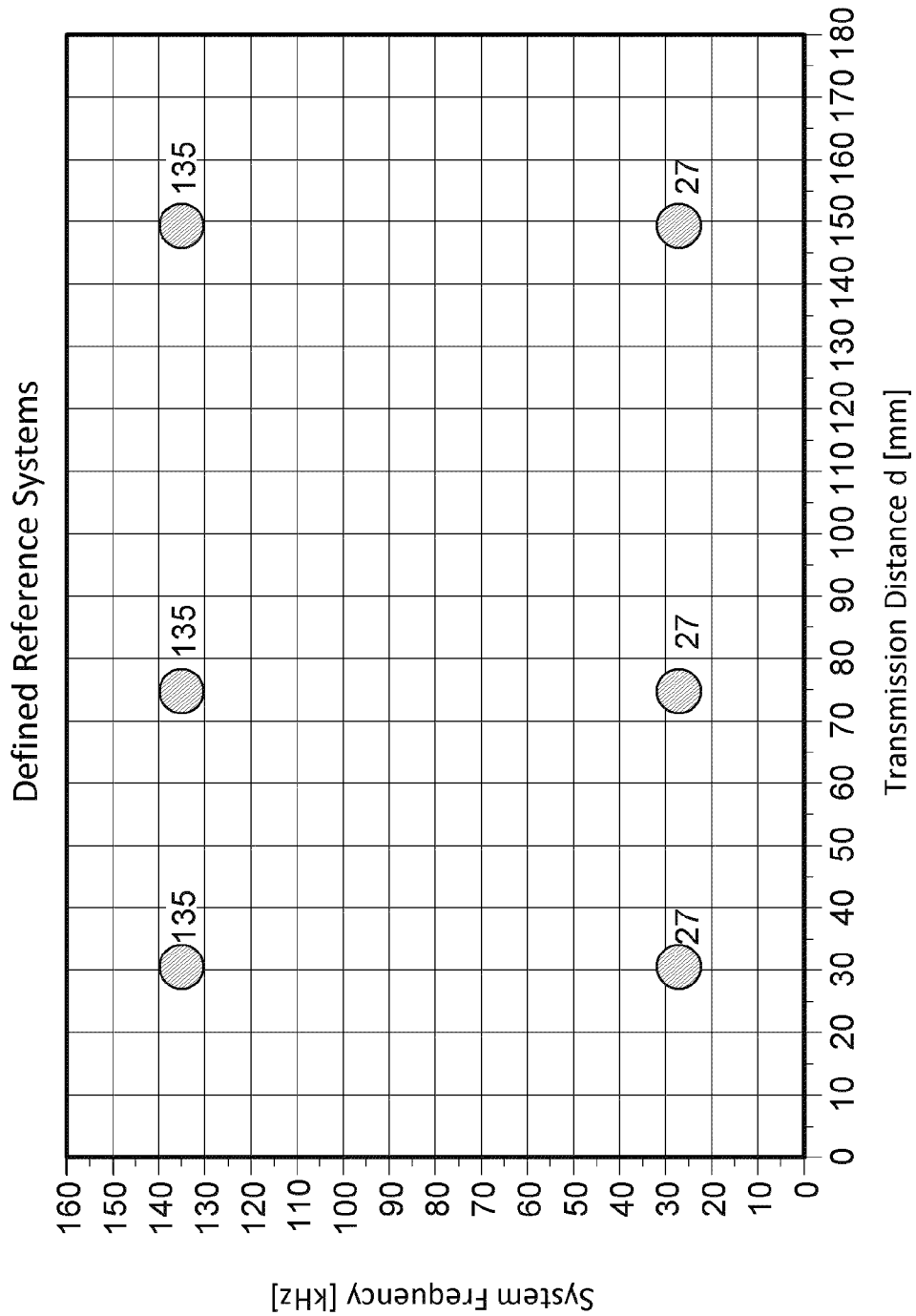
FIG. 6 is a chart showing exemplary frequencies and transmission distances that may be useful in wireless charging electric vehicles, in accordance with an exemplary embodiment of the invention.

FIG. 6 is a chart showing exemplary frequencies and transmission distances that may be useful in wireless charging electric vehicles, in accordance with an exemplary embodiment of the invention. Some example transmission distances that may be useful for electric vehicle wireless charging are about 30 mm, about 75 mm, and about 150 mm. Some exemplary frequencies may be about 27 kHz in the VLF band and about 135 kHz in the LF band.

During a charging cycle of an electric vehicle, a Base Charging Unit (BCU) of the wireless power transfer system may go through various states of operation. The wireless power transfer system may be referred to as a "charging system." The BCU may include the base wireless charging system 102a and/or 102b of FIG. 1. The BCU may also include a controller and/or a power conversion unit, such as power converter 236 as illustrated in FIG. 2. Further, the BCU may include one or more base charging pads that include an induction coil, such as induction coils 104a and 104b as illustrated in FIG. 1. As the BCU goes through the various states, the BCU interacts with a charging station. The charging station may include the local distribution center 130, as illustrated in FIG. 1, and may further include a controller, a graphical user interface, a communications module, and a network connection to a remote server or group of servers.

In some embodiments, and with reference to FIG. 1, the base system induction coil 104a and the electric vehicle induction coil 116 may be in a fixed position and the induction coils are brought within a near-field coupling region by overall placement of the electric vehicle induction coil 116 relative to the base wireless charging system 102a. However, in order to perform energy transfer rapidly, efficiently, and safely, the distance between the base system induction coil 104a and the electric vehicle induction coil 116 may need to be reduced to improve coupling. Thus, in some embodiments, the base system induction coil 104a and/or the electric vehicle induction coil 116 may be deployable and/or moveable to bring them into better alignment.

With reference to FIG. 1, the charging systems described above may be used in a variety of locations for charging an electric vehicle 112, or transferring power back to a power grid. For example, the transfer of power may occur in a parking lot environment. It is noted that a "parking area" may also be referred to herein as a "parking space." To enhance the efficiency of a vehicle wireless power transfer system 100, an electric vehicle 112 may be aligned (e.g., using a sense current) along an X direction and a Y direction to enable an electric vehicle induction coil 116 within the electric vehicle 112 to be adequately aligned with a base wireless charging system 102a within an associated parking area.

Furthermore, the disclosed embodiments are applicable to parking lots having one or more parking spaces or parking areas, wherein at least one parking space within a parking lot may comprise a base wireless charging system 102a. In some embodiments, some of the communication needs between a BCU 704 and an electric vehicle 112 may require that the electric vehicle 112 communicates with the right BCU 704, e.g. for controlling the wireless power link. In these embodiments, the wireless power transfer system may want to ensure that the electric vehicle 112 is communicating with the BCU 704 that is supposed to deliver power to the vehicle. In a scenario with only one BCU 704 (comprising a base wireless charging system 102a) and one electric vehicle 112, it may be easy to associate communications entities with the corresponding power transfer entities. However, in some embodiments where there are more than one BCU 704 (each comprising a base wireless charging system 102) in the communication reach of an electric vehicle 112 (see FIGS. 7A and 7B, in conjunction with FIG. 1) and where it may be desirable to establish 'pairing' as the electric vehicle 112 turns into a parking space where the electric vehicle induction coil 316 is in the vicinity of the base pad 702 and before the electric vehicle 112 has reached its final parking position (e.g., for reasons of positioning, vehicle guidance and alignment), 'pairing' of the right communication entities may be more challenging. This may be particularly true if the charging system uses out-of-band communications based on a standard RF ultra-high frequency (UHF) technology with insufficient ranging capability where multiple charging stations are located in multiple adjacent parking spaces and therefore each charging systems transmissions may overlap. At UHF, radio signal strength (RSS) decreases slowly with increasing distance and the relationship between RSS and distance may not be sufficiently deterministic to be used for discriminating between unwanted and wanted charging systems due to various wave propagation effects such as obstruction, reflection, diffraction and also due to the low line-of-sight path loss exponent. Moreover, RF antennas may be installed at locations different than those of the base system induction coil 104 thus may not be useful for localization of a base induction coil.

Guidance systems (such as the guidance systems 362 and 364, described above with respect to FIG. 3) may be used to assist a vehicle operator in positioning an electric vehicle 112 in a parking area to align an electric vehicle induction coil 116 within the electric vehicle 112 with a base wireless charging system 102a. Guidance systems may include electronic based approaches (e.g., radio positioning, direction finding principles, and/or optical, quasi-optical and/or ultrasonic sensing methods) or mechanical-based approaches (e.g., vehicle wheel guides, tracks or stops), or any combination thereof, for assisting an electric vehicle operator in positioning an electric vehicle 112 to enable an induction coil 116 within the electric vehicle 112 to be adequately aligned with a charging induction coil within a charging base (e.g., base wireless charging system 102a).

Figure 7A:
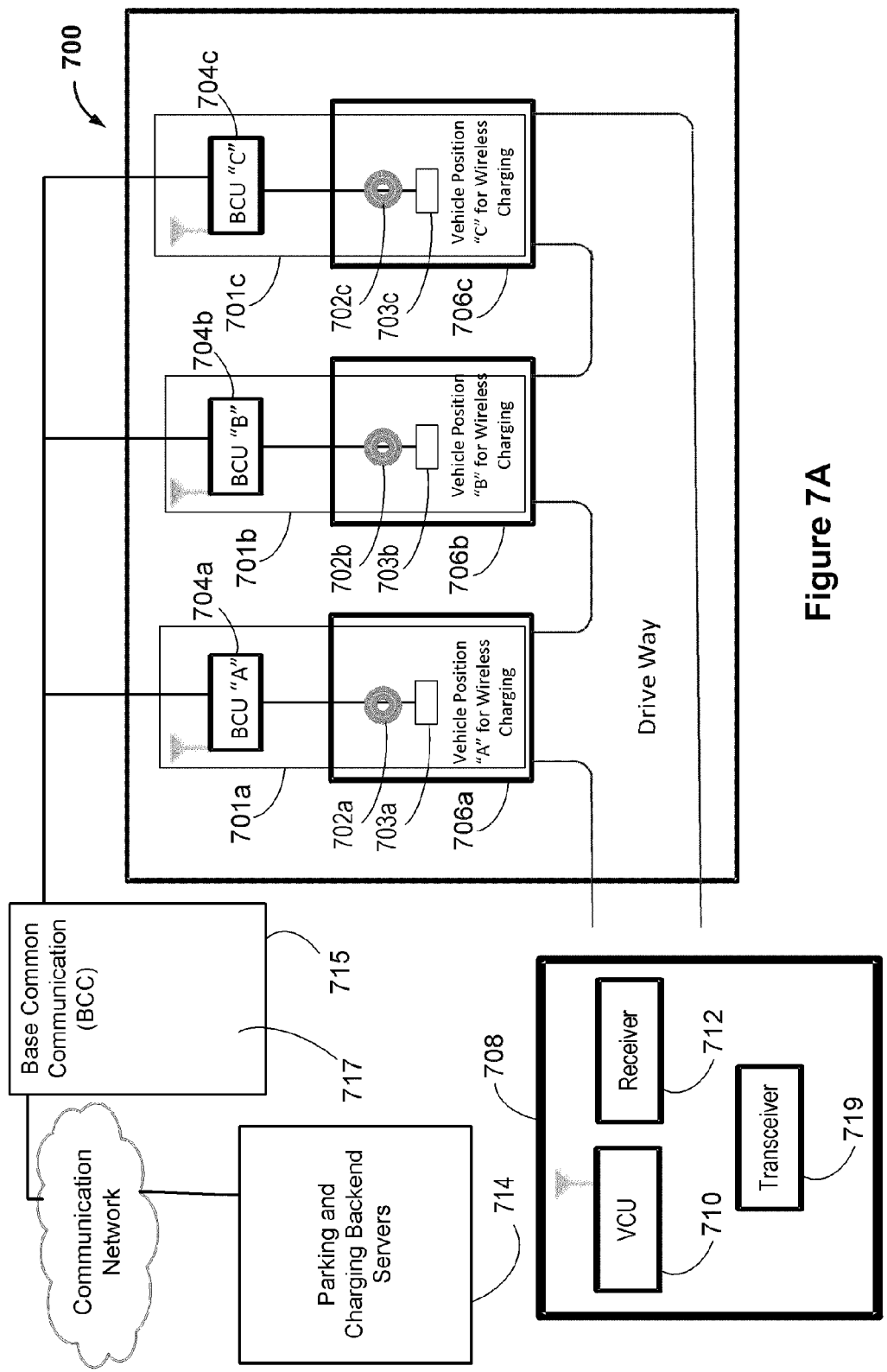
FIG. 7A is a functional block diagram of an exemplary multi-vehicle and multi-parking parking and charging system, in accordance with various implementations.

FIG. 7A is a functional block diagram of an exemplary multi-vehicle and multi-parking parking and charging system 700, in accordance with various implementations. The components illustrated in FIG. 7A may be used in the wireless power transfer system 100 of FIG. 1, in accordance with various embodiments. Moreover, some components illustrated in FIGS. 7A and 7B may correspond to components of FIG. 1. For example, electric vehicle 708 may correspond to electric vehicle 112, base pad 702 may correspond to base wireless charging system 102a, and transceiver 703 may correspond to antenna 138. In one embodiment, the parking and charging system 700 may include a plurality of charging stations 701a-c, each corresponding to one of a plurality of parking spaces 706a-c, that allow the system 700 to simultaneously charge a plurality of vehicles, such as an electric vehicle 708. In some embodiments, each charging station 701a-c may include a Base Controller Unit (BCU) (e.g., BCUs 704a-c), a base pad (e.g., base pads 702a-c), and a transceiver 703 (e.g., transceivers 703a-c).

The transceiver 703 can be configured to transmit BCU identification to a vehicle 708 (e.g., received by a receiver 712 of the vehicle 708) that is in a range of reception when the vehicle 708 is in a location compatible with charging the vehicle 708 using the BCU 704 corresponding to the transceiver 703. For example, the transceivers 703a-c can each transmit a signal (e.g., a beacon signal) comprising the BCU identification and configured to be received by the receiver 712 of the vehicle 708. In some aspects, the transceivers 703a-c may be configured such that the charging station identifier transmitted by a first transceiver 703a can only be received by a vehicle 708 that is positioned at least partially within a parking space in which the transceiver 703a is positioned. For example, a vehicle 708 that is positioned at least partially within a parking space in which charging station 701a is positioned may only be able to receive the charging station identifier from transceiver 703a but may not be able to receive the charging station identifiers for charging stations 701b and 701c. In a non-limiting example, the strength of the transmitted signal from the transceiver 703a may be at a level sufficient for successful transmission of the charging station 701a identifier to a vehicle 708 located within the entire range of the single parking space 706a. Various communication formats (e.g., RFID, Bluetooth LE, a short range proximity detection technology) are compatible with use for the transceivers 703a-c and receiver 712 in accordance with certain embodiments described herein. This communication channel between the BCUs 704a-c and the vehicle 708 can be considered to be a type of proximity detector. In certain embodiments in which the BCU 704 also receives information directly from the vehicle 708, appropriate transceivers can be used in place of the transceivers 703 and the receiver 712.

Figure 7B:
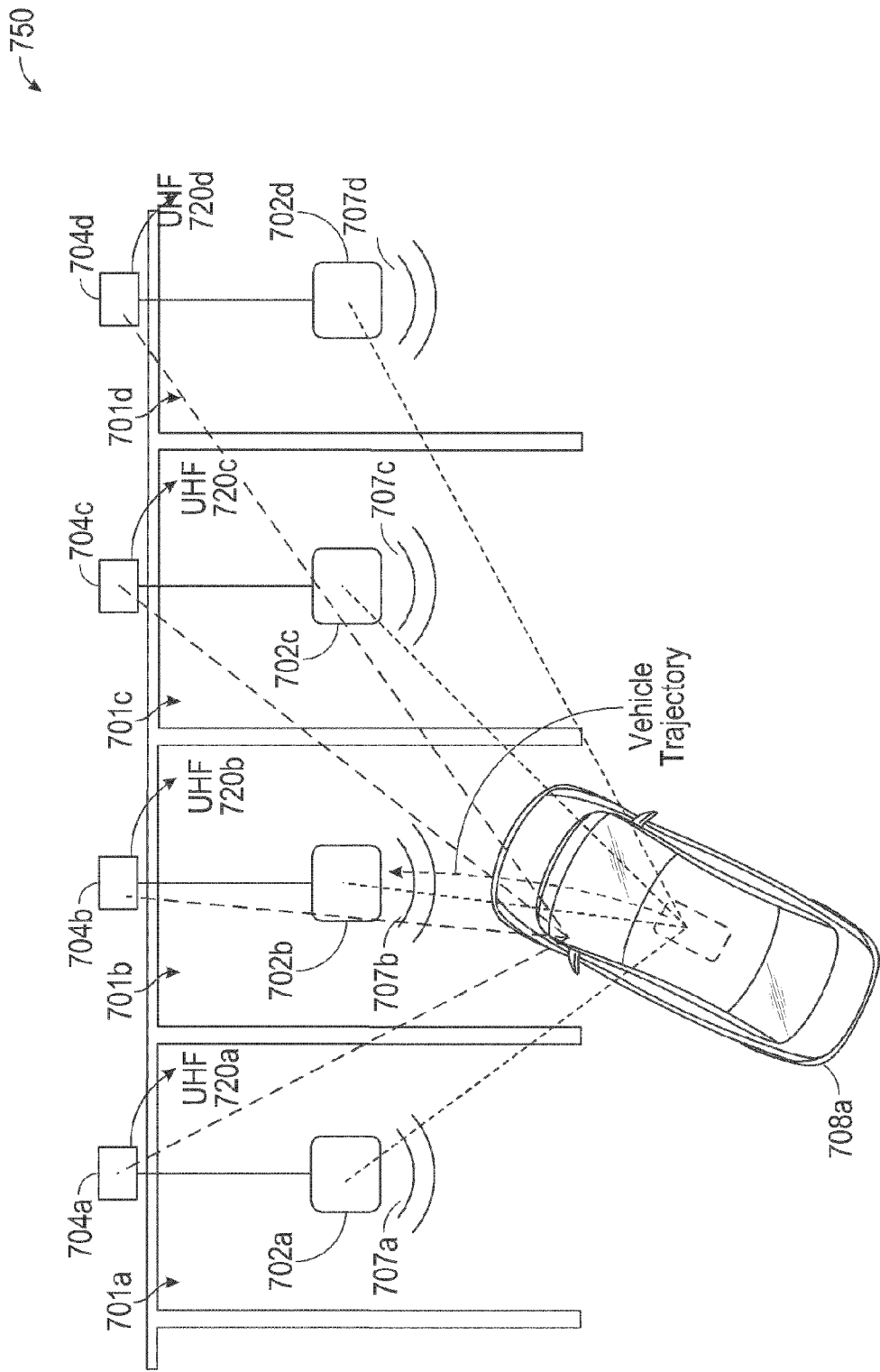
FIG. 7B schematically illustrates an exemplary scenario of communications and signaling between the charging system and the vehicle in accordance with certain embodiments described herein.

In some embodiments, the base pad 702 can be configured to transmit a signal (e.g., information or beacon signal) via a magnetic field to a vehicle 708 (e.g., received by a receiver 712 of the vehicle 708) that is in a range of reception when the vehicle 708 is in a location compatible with charging the vehicle 708 using the base pad 702 corresponding to the base pad 702 transmitting the signal. FIG. 7B is a functional block diagram of an exemplary multi-vehicle and multi-parking parking and charging system 750, in accordance with various implementations. In this embodiment, the vehicle 708a may be positioned within a parking space in which charging station 701b is located may receive multiple magnetic field beacon signals 707a-d transmitted at different frequencies by different neighboring base pads 702a-d. In this embodiment, the electric vehicle 708a may be able to discriminate between the base pad the electric vehicle 708a is going to be charged from (702b as shown) and other unwanted base pads (702a, 702c, and 702d). The electric vehicle 708a may uniquely identify the base pad 702b or a BCU 704b based on position or direction information e.g. a distance and an angle between induction coil 116 and the base pad 702 that may be determined from each of the magnetic field beacon signals 707a-d for each of the base pads 702a-d or may be determined by other navigation means. By using position or direction information, the electric vehicle 708 may automatically select and identify the closest BCU 704 or base pad 702 the electric vehicle 708 is approaching. The automatic selection may eliminate the need for a driver to manually enter a parking place number/ID or make a manual selection of the BCU 704 or base pad 702 on the electric vehicle 708 user interface. An electric vehicle 708 may use position or direction information to discriminate between wanted and unwanted beacon signals 707 and identify the wanted BCU 704 and base pad 702. This identification may result in paring vehicle 708a with base pad 702b based in part on the beacon signal 707b as the vehicle 708a pulls into a parking space 706 and before the vehicle is at least partially over the base pad 702b. Once pairing is established, the base pad 702b may communicate parking guidance information to the electric vehicle via a communication link 376 or the electric vehicle 708a may use guidance systems (such as the guidance systems 362 and 364, described above with respect to FIG. 3) to assist a vehicle operator in positioning an electric vehicle 708a in a parking area to align an electric vehicle induction coil 116 within the electric vehicle 708a with the induction coil 104 of the base pad 702b. The beacon signals 707 may be transmitted within the entire range of a parking space 706 to allow the base pad 702 and the electric vehicle 708a to establish pairing and begin communication between guidance systems 362 and 364 and alignment systems 352 and 354 before the vehicle 708a is positioned over the base pad 702b.

In some embodiments, the signal transmitted via a magnetic field by the base pad 702 may be correlated with information transmitted by transceiver 703 and received by receiver 712 of vehicle 708 to identify the base pad. This information may include information about the electric vehicle 708's characteristics, battery characteristics, charging status, and power capabilities of both the base wireless power charging system 302 and the electric vehicle charging system 314, as well as maintenance and diagnostic data for the electric vehicle 708.

In some embodiments, the electric vehicle 708 receives the signal via magnetic field and establishes a communication link by sending an acknowledging signal via the transceiver 719 to the base pad. In another embodiment, the electric vehicle sends the acknowledging signal via the magnetic field.

In some embodiments, the base pad 702 receives a signal from a transceiver 719 of a vehicle 708 and the base pad 702 transmits a signal 707 via a magnetic field to the vehicle 708 in response. The transceiver 719 may send such a trigger signal based on information received from vehicle sensors.

Such sensors may include sensors to detect object near the receiver, magnetic fields, heat, radio frequencies, changes in load, etc. or upon an action of the vehicle driver e.g. requesting a magnetic field for guidance and alignment from the charging station when turning into a parking space.

In some embodiments, the magnetic field signal transmit and receive capabilities may be configured to be reciprocal such that the electric vehicle 708 provides a signal via a magnetic field to the base pad 702 and the base pad 702 receives the signal. For example, in conjunction with FIG. 7B, the electric vehicle 708a can transmit a signal (e.g., a pairing or beacon signal) via a magnetic field comprising the electric vehicle's identification at a frequency other than that of different electric vehicles in the parking area. In some aspects, the electric vehicle 708a may be configured such that the electric vehicle identifier transmitted by the electric vehicle may be received by base pads 702a-d as the vehicle approaches the base pad 702b (as shown in FIG. 7B). In this embodiment, the base pad 702b may be able to uniquely identify the electric vehicle 708 that is going to be charged (708a as shown) from other electric vehicles 708 (not shown). The base pad 702b may uniquely identify vehicle 708a based on position or direction information e.g. a distance and an angle between induction coil 116 and the base pad 702 that is determined from each of the magnetic field beacon signals for each of the electric vehicles 708 or may be determined by other navigation means. By using position or direction information, the base pad 702b may automatically select and identify the closest approaching electric vehicle 708. A base pad 702b may use position or direction information to discriminate between wanted and unwanted beacon signals from multiple electric vehicles 708 and identify the wanted electric vehicle 708. This identification may result in paring vehicle 708a with base pad 702b as the vehicle 708a pulls into the parking space and before the vehicle is at least partially over the base pad 702b. Once pairing is established, the electric vehicle 708a may use guidance systems (such as the guidance systems 362 and 364, described above with respect to FIG. 3) to assist a vehicle operator in positioning an electric vehicle 708a in a parking area to align an electric vehicle induction coil 116 within the electric vehicle 708a with the base pad 702b.

In some embodiments, the signal transmitted via a magnetic field by the electric vehicle 708 may be correlated with information transmitted by transceiver 719 and received by the base pad 702 to identify the electric vehicle 708. This information may include information about the electric vehicle 708's characteristics, battery characteristics, charging status, and power capabilities of both the base wireless power charging system 302 and the electric vehicle charging system 314, as well as maintenance and diagnostic data for the electric vehicle 708.

In some embodiments, the base pad 702 receives the signal via magnetic field and establishes a communication link by sending an acknowledging signal via the transceiver 703 to the electric vehicle 708. In another embodiment, the base pad 702 sends the acknowledging signal via the magnetic field.

In another embodiment, a vehicle 708 receives a signal from a transceiver 703 and the vehicle 708 transmits a signal via a magnetic field to the base pad 702 in response. The transceiver 703 may send such a trigger signal based on information received from base pad or charging station sensors. Such sensors may include sensors to detect object near the base pad, magnetic fields, heat, radio frequencies, motion, changes in load, etc. or upon an action of the vehicle driver e.g. requesting a magnetic field for guidance and alignment from the charging station when turning into a parking space.

The charging stations 701a-c may communicate with a base common communication (BCC) system 715 configured to communicate with each of the base charging stations 701a-c and configured to communicate with one or more parking and charging backend servers 714 via a network 716. The network 716 may be any type of communication network such as, for example, the Internet, a wide area network (WAN), a wireless local area network (WLAN), etc. Various communication formats (e.g., Ethernet, RS-485, CAN) are compatible for communication between the BCC system 715 and the BCUs 704a-c in accordance with certain embodiments described herein.

The BCC 715 can comprise a receiver 717 configured to communicate with a transceiver 719 of the vehicle 708, as described more fully below. Various communication formats (e.g., DSRC, Bluetooth LE, WiFi) are compatible for communication between the BCC system 715 and the vehicle 708 (via the receiver 717 and the transceiver 719) in accordance with certain embodiments described herein. In certain embodiments in which the BCC 715 also transmits information to the vehicle 708, an appropriate transceiver can be used in place of the receiver 717.

In some embodiments, each charging station 701a-c can correspond to the base wireless charging system 302, discussed above with respect to FIG. 3. For example, the BCUs 701a-c can correspond to the base charging system controller 342, the base pads 702a-c can correspond to the base system induction coil 304, and each charging station 701a-c can include the base charging communication system 372. In other embodiments, the charging system 700 may include one or more base wireless charging systems 302, which can each include a plurality of each system component such as the base charging system controller 342, and the base system induction coil 304. In various embodiments, the transceivers 703a-c can be placed curbside, on the ground next to the base pads 702a-c, and/or integrated directly into the base bad 702a. The charging stations 701a-c can include multiple transmitters.

In some embodiments, the plurality of parking spaces 706a-c are each marked with a space indicator, such as a letter or a number. For example, a sign of a charging station may be provided on the parking space so as to allow a driver to identify the corresponding charging station 701. As shown in FIG. 7A, the parking space 706a, corresponding to the charging station 701a, the BCU 704a, and the base pad 702a, may be marked with a space indicator "A." The parking space 706b, corresponding to the charging station 701b, the BCU 704b, and the base pad 702b, may be marked with a space indicator "B." The parking space 706c, corresponding to the charging station 701c, the BCU 704c, and the base pad 702c, may be marked with a space indicator "C." The space indicators may assist a user to identify available charging stations 701a-c in the parking and charging system 700.

The electric vehicle 708 may include a Vehicle Controller Unit (VCU) 710, a receiver 712, and a transceiver 719. In an embodiment, the electric vehicle 708 can be the vehicle 112 (FIG. 1). The electric vehicle 708 can include the electric vehicle charging system 314, described above with respect to FIG. 3. For example, the VCU 710 can correspond to the electric vehicle controller 344, and the electric vehicle 708 can include the electric vehicle communication system 374. The electric vehicle 708 may include multiple receivers, transmitters, and/or transceivers.

The electric vehicle communication system 374 may be used to communicate with one or more of a plurality of base charging communication systems 372 located within each of the charging stations 701a-c in the parking and charging system 700.

As discussed above, with respect to FIG. 3, the electric vehicle communication system 374 can communicate with the base charging communication system 372 by any wireless communication system such as Dedicated Short-Range Communications (DSRC), IEEE 702.11x (e.g., WiFi), Bluetooth, zigbee, cellular, etc. and by signals via magnetic field provided by power induction coils 304 and 316. Accordingly, in some embodiments, the electric vehicle communication system 374 can act as a base station to which the base charging communication system 372 can connect. In other embodiments, each base charging communication system 372 can act as a base station to which the electric vehicle communication system 374 can connect.

FIG. 7B also illustrates an exemplary communication between a base pad 702b and an electric vehicle 708 in accordance with certain embodiments described herein. Prior to the electric vehicle 708 (e.g., vehicle 708a) being positioned at least partially over the base pad 702b, a communication link can be established between the vehicle 708a and the base pad 702b. The base pad 702b can transmit, via the power induction coil 304 or via one or more additional coils, an information signal 707b via a magnetic field at an intensity level lower than the intensity level for wireless power transmission. For example, in an aspect, the induction coil 304 may be configured to provide wireless power and the signal 707b via a magnetic field. In another aspect, the induction coil 304 may be configured to provide wireless power, while the base pad 702b further comprises one or more additional coils (e.g., integrated within the housing or substantially coplanar with the induction coil 304, and the like) that are configured to provide the signal. Use of a separate coil to provide the signal may allow placement of the signal coil in a location that allows for better reception of the signal. In some embodiments, the separate coil may also comprise the coils used in guidance systems 362 and 364, described above with respect to FIG. 3, and may be used to generate an information signal 707 for identification and pairing between the electric vehicle 708 and a base pad 702. The base pad 702 may provide the information signal at a frequency other than a frequency for wireless power transmission. To separate the signal transmission of the base pad 702b from the signal transmissions of other base pads (e.g., 702a, 702c, 702d), the base pad 702b may modulate the signal based on a modulation of the magnetic field. For example, when the modulation is a frequency division scheme, the signal frequencies may be assigned fixed or dynamically on a temporary basis in a separate frequency that is offset from the wireless power transmission operating frequency by at least 10 kHz to avoid interference between the signal and the wireless power transfer and interference between multiple signals. The vehicle 708a can receive the signal 707b to identify the base pad 702b and establish a communication link with the base pad 702b to pair with the charging station 701b. The vehicle 708a may also identify the base pad 702b by correlating the signal 707b with information or RF signals (e.g. UHF signal 720b) from the BCU 704b received by the transceiver 719.

In certain embodiments, the electric vehicle 708 may establish a communication link between the vehicle 708 and the base pad 702. In some aspects, the vehicle 708 may transmit, via the power induction coil 316, an information signal via a magnetic field at an intensity level lower than the intensity level for wireless power transmission. The signal can be provided at a frequency other than a frequency for wireless power transmission. To separate the signal transmission of vehicle 708a from the signal transmissions of other vehicles, the signal can be modulated based on a variation of the magnetic field. For example, when the variation is a frequency division scheme, the signal frequencies may be assigned fixed or dynamically on a temporary basis in a separate frequency that is offset from the wireless power transmission operating frequency by at least 10 kHz to avoid interference between the signal and the wireless power transfer and interference between multiple signals. The base pad 702 can receive the signal to identify the vehicle 708a and establish a communication link with the vehicle 708a to pair with the charging station 701b. The vehicle can also be identified by correlating the magnetic signal with information or RF signals sent from the transceiver 719 and received by the transceiver 703.

In another embodiment, the base pad can also receive a signal from the transceiver 719 indicating that the electric vehicle 708 is in proximity to the base pad 702. In this embodiment, the base pad 702 can transmit a signal 707 via a magnetic field in response. For example, the vehicle load detecting sensor may detect that the base pad 702 is in proximity to the electric vehicle. The transceiver 719 can then send a signal via a radio frequency to the transceiver 703 indicating that the vehicle is in proximity to the base pad 702. The base pad 702 may then receive and analyze this information and send a signal 707 via a magnetic field having an intensity level lower than for wireless power transfer and at a power sufficient to identify the base pad 702 and begin the process of establishing a communication link and pairing the electric vehicle 708 to the base pad 702 as described above.

In another embodiment, the vehicle 708 can also receive a signal from the transceiver 703 indicating that the base pad 702 is in proximity to the vehicle 708. In this embodiment, the vehicle 708 can transmit a signal via a magnetic field in response. For example, the base pad 702 motion detector sensor may detect that the electric vehicle 708 is in proximity to the base pad 702. The transceiver 703 can then send a signal via a radio frequency to the transceiver 719 indicating that the vehicle 708 is in proximity to the base pad 702. The electric vehicle 708 may then receive and analyze this information and send a signal via a magnetic field having an intensity level lower than for wireless power transfer and at a power sufficient to identify the electric vehicle 708 and begin the process of establishing a communication link and pairing the electric vehicle 708 to the base pad 702 as described above.

In another embodiment, pairing may take place already when the vehicle 708 turns into a parking space when the electric vehicle induction coil 316 is in the vicinity of the base pad 702 (approach phase). This may be possible when additional relative position information e.g. distance and a direction is used and as soon as the system can unambiguously identify the base pad 702 the vehicle 708 is approaching. Position information may be derived from the magnetic field signal by detecting the X, Y, Z directional components of the magnetic field using an appropriate sensor system.

When the electric vehicle 708 enters the parking and charging system 700 with the plurality of available charging stations 701a-c, a driver of the vehicle 708 is able to identify one or more of the charging stations 701 (e.g., the charging station 701 comprising the BCU 704 scheduled to charge the vehicle 708). In one embodiment, the driver of a vehicle 708 may visually identify the parking spaces 706 using, for example, the space indicators as described above. Thus, a driver of the vehicle 708 may navigate within the parking facility to find the available (e.g., assigned, scheduled, or reserved) charging station 701 for providing energy to charge the electric vehicle 708. When the vehicle 708 approaches the parking space 706, or once the vehicle 708 is parked in the parking space 706, the charging station 701 may attempt to pair via the magnetic field signal described above with the vehicle 708 which is now within communication range.

Once a communication link is established between the electric vehicle 708 and the charging station 701 corresponding to appropriate parking space 706, the communication link can be used for one or more of: electric vehicle guidance, electric vehicle alignment, charging control, status communication, authorization and/or identification, payment management, etc.

Figure 8:
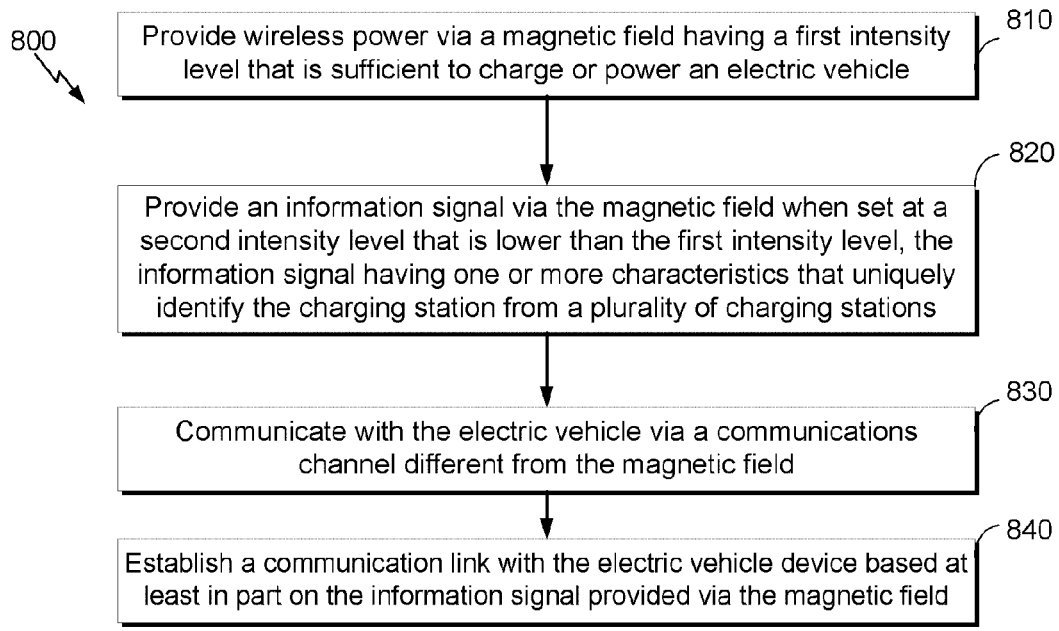
FIG. 8 illustrates a flowchart of an exemplary method of pairing a charging station with an electric vehicle, in accordance with certain embodiments described herein.
Figure 9:
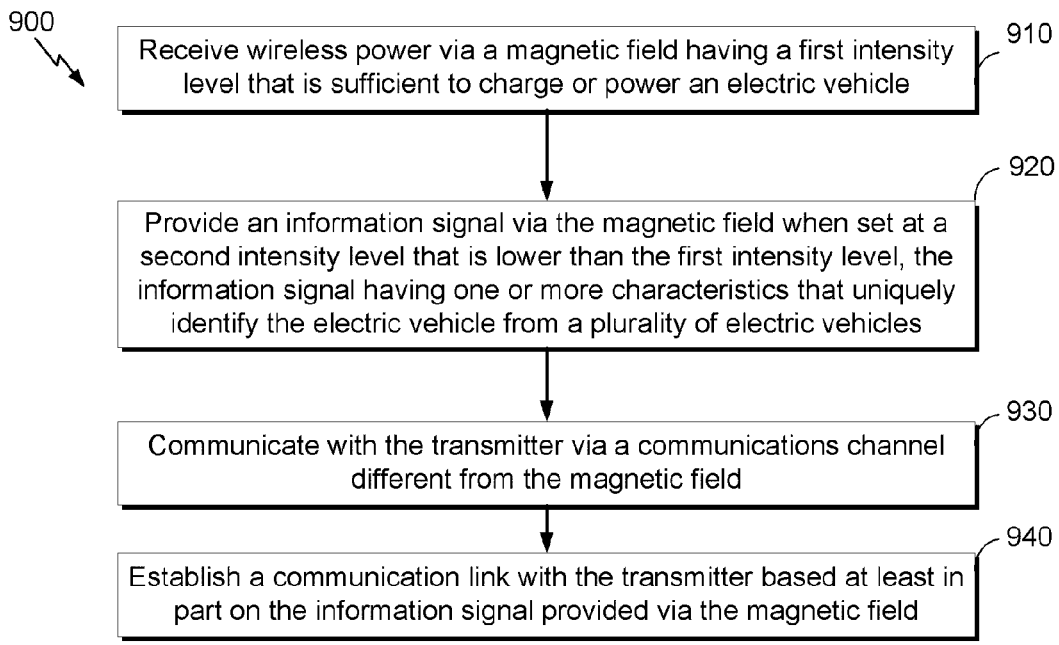
FIG. 9 illustrates a flowchart of an exemplary method of pairing an electric vehicle with a charging station, in accordance with certain embodiments described herein.

FIG. 8 illustrates a flowchart of an exemplary method 800 of pairing a charging station with an electric vehicle 708, in accordance with certain embodiments described herein. FIG. 9 illustrates a flowchart of an exemplary method 900 of pairing an electric vehicle 708 with a charging station in accordance with certain embodiments described herein. Although the method 800 and the method 900 are described herein with reference to the electric vehicle 708 and multi-vehicle and multi-parking parking and charging system 700, discussed above with respect to FIGS. 7A and 7B, a person having ordinary skill in the art will appreciate that the method 800 and the method 900 may be implemented by other suitable devices and systems. For example, the method 800 may be performed by a processor or controller such as, for example, the VCU 710 (FIG. 7A). For another example, the method 900 may be performed by a processor or controller such as, for example, the BCC 715 (FIG. 7A). Although the method 800 and the method 900 are each described herein with reference to a particular order, in various embodiments, blocks herein may be performed in a different order, or omitted, and additional blocks may be added. For example, the operational block 810 may be preceded by a vehicle 708 that transmits a signal to the base station indicating that the vehicle is in proximity to the base pad. The base pad then sends a signal via a magnetic field as in operational block 810. In another example, the operational block 910 may be preceded by a base pad that transmits a signal to the vehicle 708 indicating that the vehicle is in proximity to the base pad. The electric vehicle then sends a signal via a magnetic field as in operational block 910.

In an operational block 810 of the method 800, wireless power is provided to an electric vehicle 708 via a magnetic field at a first intensity level. In an operational block 820 of the method 800, an information signal is provided to the electric vehicle via the magnetic field at a second intensity level lower than the first intensity level, the information signal having one or more characteristics that uniquely identify the charging station from a plurality of charging stations. In an operational block 830 of the method 800, a charging station communicates with the electric vehicle via a communications channel different from the magnetic field. In an operational block 840 of the method 800, a communication link is established with the electric vehicle based at least in part on the information signal provided via the magnetic field.

In an operational block 910 of the method 900, wireless power is received from a charging station via a magnetic field at a first intensity level. In an operational block 920 of the method 900, an information signal is provided to the charging station via the magnetic field at a second intensity level lower than the first intensity level, the information signal having one or more characteristics that uniquely identify the electric vehicle from a plurality of electric vehicles. In an operational block 930 of the method 900, an electric vehicle communicates with the charging station via a communications channel different from the magnetic field. In an operational block 940 of the method 900, a communication link is established with the charging station based at least in part on the information signal provided via the magnetic field.

Figure 10:
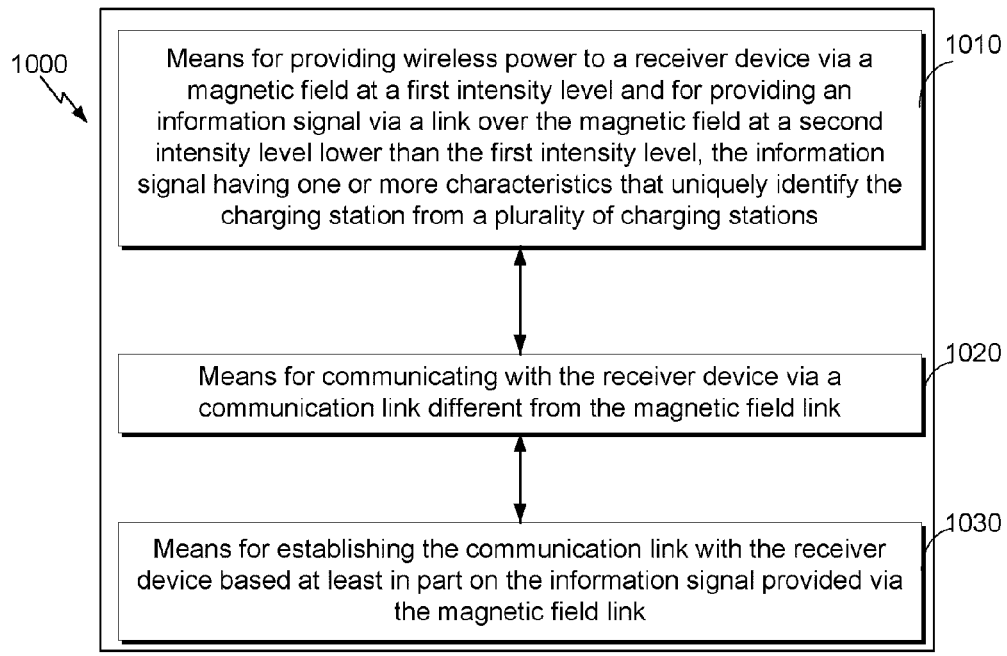
FIG. 10 is a functional block diagram of an apparatus for providing wireless power, in accordance with certain embodiments described herein.
Figure 11:
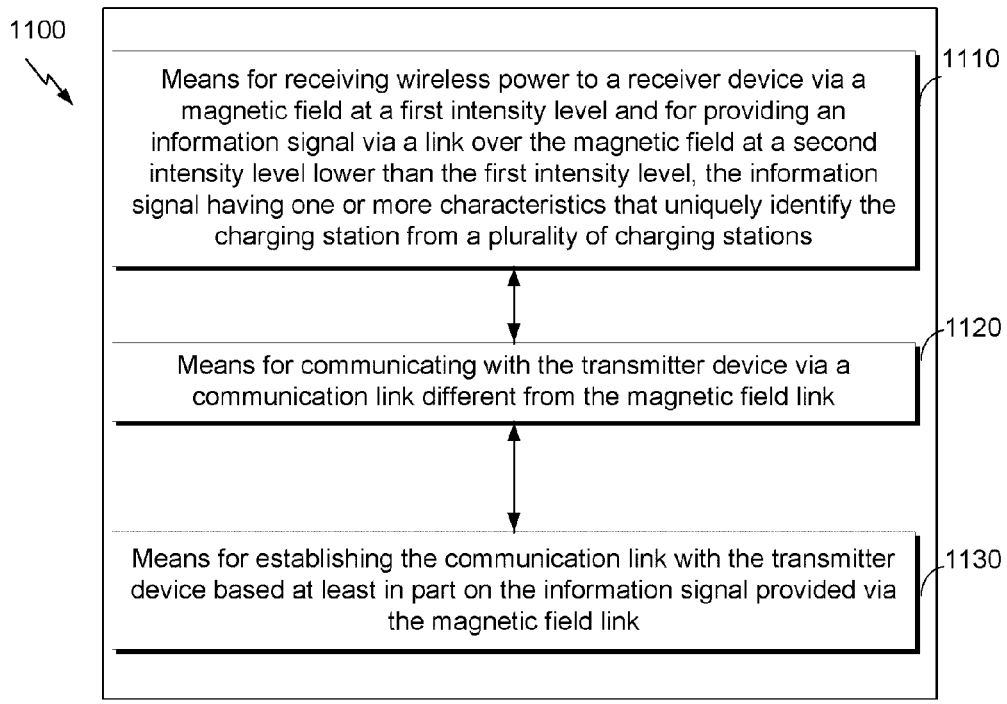
FIG. 11 is a functional block diagram of an apparatus for receiving wireless power, in accordance with certain embodiments described herein.

FIG. 10 is a functional block diagram of an apparatus 1000 for providing wireless power, in accordance with certain embodiments described herein. FIG. 11 is a functional block diagram of an apparatus 1100 for receiving wireless power, in accordance with certain embodiments described herein. Those skilled in the art will appreciate that the apparatus 1000 and the apparatus 1100 may have more components than the simplified block diagrams show in FIGS. 10 and 11. FIGS. 10 and 11 include only those components useful for describing some prominent features of implementations within the scope of the claims.

The apparatus 1000 comprises means 1010 for providing wireless power to a receiver device via a magnetic field at a first intensity level and for providing an information signal via the magnetic field at a second intensity level lower than the first intensity level, the information signal having one or more characteristics that uniquely identify the providing means from a plurality of providing means. In certain embodiments, the means 1010 for providing wireless power and a signal via a magnetic field can be implemented by the base pad 702 (FIG. 7A). The apparatus 1000 further comprises means 1020 for communicating with the receiver device via a communications channel different from the magnetic field. In certain embodiments, the means 1020 for communicating comprises the transceivers 703a-c (FIG. 7A). The apparatus 1000 further comprises means 1030 for establishing a communication link with the receiver device based at least in part on the information signal provided via the magnetic field. In certain embodiments, the means 1030 for establishing comprises the transceivers 703a-c (FIG. 7A).

The apparatus 1100 includes means 1110 for receiving wireless power from a transmitter device via a magnetic field at a first intensity level and for providing an information signal via the magnetic field at a second intensity level lower than the first intensity level. In certain embodiments, the means 1110 for receiving wireless power and for providing a signal via a magnetic field can be implemented by the power induction coil 316 (FIG. 3). The apparatus 1100 further comprises means 1120 for communicating with the transmitter device via a communications channel different from the magnetic field. In certain embodiments, the means 1120 for communicating comprises the transceiver 719. The apparatus 1100 further comprises means 1130 for establishing a communication link with the transmitter device based at least in part on the information signal provided via the magnetic field. In certain embodiments, the means 1130 for establishing comprises the transceivers 719 (FIG. 7A).

The various operations of methods described above may be performed by any suitable means capable of performing the operations, such as various hardware and/or software component(s), circuits, and/or module(s). Generally, any operations illustrated in the Figures may be performed by corresponding functional means capable of performing the operations.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. The described functionality may be implemented in varying ways for each particular application, but such implementation decisions should not be interpreted as causing a departure from the scope of the embodiments of the invention.

The various illustrative blocks, modules, and circuits described in connection with the embodiments disclosed herein may be implemented or performed with a general purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm and functions described in connection with the embodiments disclosed herein may be embodied directly in hardware, in a software module executed by a processor, or in a combination of the two. If implemented in software, the functions may be stored on or transmitted over as one or more instructions or code on a tangible, non-transitory computer-readable medium. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD ROM, or any other form of storage medium known in the art. A storage medium is coupled to the processor such that the processor can read information from, and write information to, the storage medium. In the alternative, the storage medium may be integral to the processor. Disk and disc, as used herein, includes compact disc (CD), laser disc, optical disc, digital versatile disc (DVD), floppy disk and blu ray disc where disks usually reproduce data magnetically, while discs reproduce data optically with lasers. Combinations of the above should also be included within the scope of computer readable media. The processor and the storage medium may reside in an ASIC. The ASIC may reside in a user terminal. In the alternative, the processor and the storage medium may reside as discrete components in a user terminal.

For purposes of summarizing the disclosure, certain aspects, advantages and novel features of the inventions have been described herein. It is to be understood that not necessarily all such advantages may be achieved in accordance with any particular embodiment of the invention. Thus, the invention may be embodied or carried out in a manner that achieves or optimizes one advantage or group of advantages as taught herein without necessarily achieving other advantages as may be taught or suggested herein.

Various modifications of the above described embodiments will be readily apparent, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. An apparatus for providing wireless power, comprising:
a transmitter comprising one or more coils configured to provide wireless power via a magnetic field having a first intensity level that is sufficient to charge or power an electric vehicle, the one or more coils further configured to provide an information signal via the magnetic field when the magnetic field is set at a second intensity level that is lower than the first intensity level, the information signal having one or more characteristics that uniquely identify the transmitter from a plurality of transmitters; and
a transceiver connected to the transmitter and configured to:
communicate with the electric vehicle via a communication link that is different from the magnetic field; and
establish the communication link with the electric vehicle based at least in part on the information signal provided via the magnetic field, the transmitter further configured to communicate with the electric vehicle, via the communication link, parking guidance information to the location of the one or more coils.

2. The apparatus of claim 1, wherein establishing the communication link comprises establishing the communication link before a portion of one or more coils of the electric vehicle are positioned over the one or more coils of the transmitter.

3. The apparatus of claim 1, wherein the one or more coils comprises a first coil configured to provide wireless power to the electric vehicle via the magnetic field at the first intensity level and a second coil configured to provide the information signal via the magnetic field at the second intensity level.

4. The apparatus of claim 1, wherein the transmitter is further configured to provide wireless power at a first frequency and provide the information signal at a second frequency, the second frequency different from the first frequency.

5. The apparatus of claim 1, wherein the second intensity level is of sufficient power to be received by the electric vehicle at least within a portion of an area defining a parking space.

6. The apparatus of claim 1, wherein the transmitter is further configured to provide the information signal at a frequency different from a frequency of another information signal provided via another magnetic field from at least one other transmitter of the plurality of transmitters.

7. The apparatus of claim 1, wherein the transceiver is further configured to:
   transmit and receive information related to the wireless power provided between the transmitter and the electric vehicle; and
   establish the communication link based at least in part on information identifying the electric vehicle, or information regarding the wireless power provided between the transmitter and the electric vehicle, provided or received by the transceiver.

8. The apparatus of claim 1, wherein the transmitter alternates or modulates the magnetic field to generate the information signal.

9. The apparatus of claim 1, wherein the transceiver is further configured to receive approach information indicating the electric vehicle is approaching the location of the one or more coils, and wherein the transmitter is configured to provide the information signal in response to the transceiver receiving the approach information.

10. The apparatus of claim 1, further comprising a receiver configured to:
    receive an information signal from each of a plurality of electric vehicles, each information signal received via a different magnetic field;
    determine a position or direction of each electric vehicle of the plurality of electric vehicles based on the information signal; and
    select an electric vehicle for wireless charging that has a position closest to the one or more coils.

11. The apparatus of claim 1, further comprising a receiver configured to:
    receive a second information signal via a second magnetic field from the electric vehicle, wherein the second information signal uniquely identifies the electric vehicle from a plurality of electric vehicles; and
    establish the communication link with the electric vehicle based at least in part on the second information signal received from the electric vehicle.

12. The apparatus of claim 11, wherein the receiver receives the second information signal at a frequency different from a frequency of another information signal the transceiver receives via another magnetic field from at least one other electric vehicle of the plurality of electric vehicles.

13. An apparatus for receiving wireless power, comprising:
    a receiver comprising one or more coils configured to receive wireless power from a charging station via a magnetic field having a first intensity level that is sufficient to charge or power a battery, the one or more coils further configured to provide an information signal via the magnetic field when the magnetic field is set at a second intensity level that is lower than the first intensity level, the information signal having one or more characteristics that uniquely identify the receiver from a plurality of receivers; and
    a transceiver connected to the receiver and configured to:
       communicate with the charging station via a communication link that is different from the magnetic field; and
       establish the communication link with the charging station based at least in part on the information signal provided via the magnetic field, wherein the receiver is further configured to communicate with the charging station, via the communication link, parking guidance information to the location of the one or more coils.

14. The apparatus of claim 13, wherein the one or more coils comprises a first coil configured to receive wireless power from the charging station via the magnetic field at the first intensity level and a second coil configured to provide the information signal via the magnetic field at the second intensity level.

15. The apparatus of claim 13, wherein the receiver is further configured to receive wireless power at a first frequency and provide the information signal at a second frequency, the second frequency different from the first frequency.

16. The apparatus of claim 13, wherein the receiver is further configured to provide the information signal at a frequency different from a frequency of another information signal provided via another magnetic field from at least one other receiver of the plurality of receivers.

17. The apparatus of claim 13, wherein the transceiver is further configured to receive approach information indicating the one or more coils is approaching the location of the charging station, and wherein the receiver is configured to provide the information signal in response to the transceiver receiving the approach information.

18. The apparatus of claim 13, wherein the receiver is further configured to:
    receive an information signal from each of a plurality of charging stations, each information signal received via a different magnetic field;
    determine a position or direction of each charging station of the plurality of charging stations based on the information signal; and
    select a charging station for wireless charging that has a position closest to the one or more coils.

19. The apparatus of claim 13, wherein the receiver is further configured to:
    receive a second information signal via a second magnetic field from the charging station, wherein the second information signal uniquely identifies the charging station from a plurality of charging stations; and
    establish the communication link with the charging station based at least in part on the second information signal received from the charging station.

20. The apparatus of claim 19, wherein the receiver receives the second information signal at a frequency different from a frequency of another information signal the transceiver receives via another magnetic field from at least one other charging station of the plurality of charging stations.

21. A method of pairing a charging station with an electric vehicle, comprising:
    providing wireless power via a magnetic field having a first intensity level that is sufficient to charge or power the electric vehicle;
    providing an information signal via the magnetic field when the magnetic field is set at a second intensity level that is lower than the first intensity level, the information signal having one or more characteristics that uniquely identify the charging station from a plurality of charging stations;
    communicating with the electric vehicle via a communication link that is different from the magnetic field, communicating via the communication link comprising communicating with the electric vehicle parking guidance information to the location of the charging station; and
    establishing the communication link with the electric vehicle based at least in part on the information signal provided via the magnetic field.

22. The method of claim 21, wherein providing wireless power comprises providing wireless power at a first frequency, and providing an information signal comprises providing an information signal at a second frequency, the second frequency different from the first frequency.

23. The method of claim 21, wherein providing an information signal comprises providing an information signal at a frequency different from a frequency of another information signal provided via another magnetic field from at least one other charging station of the plurality of charging stations.

24. The method of claim 21, further comprising receiving approach information indicating the electric vehicle is approaching the location of the charging station, and wherein providing an information signal comprises providing an information signal in response to the transceiver receiving the approach information.

25. The method of claim 21, further comprising receiving a second information signal via a second magnetic field from the electric vehicle, wherein the second information signal uniquely identifies the electric vehicle from a plurality of electric vehicles; and wherein establishing the communication link comprises establishing the communication link with the electric vehicle based at least in part on the second information signal received from the electric vehicle.

26. The method of claim 25, wherein receiving a second information signal comprises receiving a second information signal at a frequency different from a frequency of another information signal received via another magnetic field from at least one other electric vehicle of the plurality of electric vehicles.

27. An apparatus for providing wireless power, comprising:

means for providing wireless power via a magnetic field having a first intensity level that is sufficient to charge or power an electric vehicle, the providing means further configured to provide an information signal via the magnetic field when the magnetic field is set at a second intensity level that is lower than the first intensity level, the information signal having one or more characteristics that uniquely identify the providing means from a plurality of providing means; and means for communicating with the electric vehicle via a communication link that is different from the magnetic field, the communicating means configured to communicate with the electric vehicle, via the communication link, parking guidance information to the location of the charging station; and means for establishing the communication link with the electric vehicle based at least in part on the information signal provided via the magnetic field.

28. The apparatus of claim 27, wherein the providing means comprises a transmitter, wherein the communication means, transmitting and receiving means, and the establishing means comprise a transceiver.

29. The apparatus of claim 27, wherein the providing means is further configured to provide wireless power at a first frequency and provide the information signal at a second frequency, the second frequency different from the first frequency.

30. The apparatus of claim 27, wherein the providing means is further configured to provide the information signal at a frequency different from a frequency of an information signal provided via a magnetic field from at least one charging station of the plurality of charging stations.

* * * * *